United States Patent
Innes et al.

(10) Patent No.: US 9,531,714 B2
(45) Date of Patent: Dec. 27, 2016

(54) ENTERPRISE AUTHENTICATION VIA THIRD PARTY AUTHENTICATION SUPPORT

(71) Applicant: Citrix Systems, Inc., Fort Lauderdale, FL (US)

(72) Inventors: Andrew Innes, Cambridge (GB); Chris Mayers, Cambridge (GB); Ajay Soni, Saratoga, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 251 days.

(21) Appl. No.: 14/317,795

(22) Filed: Jun. 27, 2014

(65) Prior Publication Data

US 2015/0381621 A1 Dec. 31, 2015

(51) Int. Cl.
*G06F 7/04* (2006.01)
*G06F 17/30* (2006.01)
(Continued)

(52) U.S. Cl.
CPC ........... *H04L 63/0884* (2013.01); *G06F 21/31* (2013.01); *G06F 21/44* (2013.01); *H04L 9/321* (2013.01);
(Continued)

(58) Field of Classification Search
CPC ......... H04W 12/06; G06F 21/31; H04L 63/08; H04L 63/102; H04L 63/083
(Continued)

(56) References Cited

U.S. PATENT DOCUMENTS

2008/0134311 A1 6/2008 Medvinsky et al.
2013/0227659 A1* 8/2013 Raleigh ............ G06Q 10/06375
726/5
(Continued)

FOREIGN PATENT DOCUMENTS

WO 2011023456 A2 3/2011

OTHER PUBLICATIONS

Mar. 5, 2015 (WO) International Search Report—App PCT/US2014/048229.
(Continued)

*Primary Examiner* — Kambiz Zand
*Assistant Examiner* — Stephen Sanders
(74) *Attorney, Agent, or Firm* — Banner & Witcoff, Ltd.

(57) ABSTRACT

Methods and systems are disclosed for providing approaches to enterprise authentication via third party authentication support. The methods and systems may include transmitting, by a computing device to an authentication device, a request to authenticate a client device application via a forms login protocol, and transmitting, by the computing device to the client device application, a first credential form retrieved from an authentication device generated by an extension device. The methods and systems may also include receiving, by the computing device from the client device application, a first authentication credential, and transmitting, by the computing device to the authentication service via the extension device, the first authentication credential. The methods and systems may also include transmitting, by the computing device and in response to a successful validation of the first authentication credential, an approval of the request made by the client device application to authenticate via the forms login protocol.

23 Claims, 11 Drawing Sheets

(51) Int. Cl.
*H04L 29/06* (2006.01)
*G06F 21/31* (2013.01)
*G06F 21/44* (2013.01)
*H04L 9/32* (2006.01)
*H04W 12/06* (2009.01)

(52) U.S. Cl.
CPC .............. *H04L 9/3271* (2013.01); *H04L 63/08* (2013.01); *H04W 12/06* (2013.01)

(58) Field of Classification Search
USPC .......................................................... 726/7
See application file for complete search history.

(56) References Cited

U.S. PATENT DOCUMENTS

| | | | | |
|---|---|---|---|---|
| 2014/0082715 | A1 | 3/2014 | Grajek et al. | |
| 2014/0096216 | A1* | 4/2014 | Weiss | G06F 21/32 726/7 |
| 2014/0181892 | A1* | 6/2014 | Von Bokern | H04L 63/102 726/1 |
| 2014/0289833 | A1* | 9/2014 | Briceno | H04L 63/08 726/7 |

OTHER PUBLICATIONS

"Kerberos (protocol)," downloaded from <http://en.wikipedia.org/wiki/Kerberos_(protocol)>, 6 pages.

"Configuring Kerberos Logon," Citrix Product Documentation, downloaded from http://support.citrix.com/proddocs/topic/xenapp6-w2k8-admin/ps-securing-cfg-kerb-logon-v2.html, 4 pages.

"Endpoint Analysis," Citrix Access Gateway, Features Overview, downloaded from <http://www.citrix.com/content/dam/citrix/en_us/documents/products-solutions/citrix-access-gateway-endpoint-analysis.pdf?accessmode=direct>, 3 pages.

"Connecting to StoreFront by Using Email-Based Discovery," Citrix Product Documentation, downloaded from <http://support.citrix.com/proddocs/topic/netscaler-gateway-101/ng-clg-storefront-email-discovery-tsk.html>, 3 pages.

"Local and Remote Discovery Fails for on XenApp Service but the Farm Functions as Normal," Citrix Support, downloaded from <http://support.citrix.com/article/CTX130882>, 2 pages.

"About Controller Discovery," Citrix Product Documentation, downloaded from <http://support.citrix.com/proddocs/topic/xendesktop-rho/cds-about-broker-discovery-rho.html>, 3 pages.

"Understanding the Discovery Process," Citrix Product Documentation, downloaded from <http://support.citrix.com/proddocs/topic/command-center-41/cc-get-started-disc-proc-con.html>, 3 pages.

"NetScaler Gateway—Access Control Management—Citrix," downloaded from http://www.citrix.com/products/netscaler-gateway/overview.html, 3 pages.

* cited by examiner

ENTERPRISE AUTHENTICATION VIA THIRD PARTY AUTHENTICATION SUPPORT

FIELD

Aspects described herein generally relate to authentication of client devices within enterprise systems. More specifically, certain aspects herein provide techniques to authenticate client devices on enterprise systems via third party authentication support.

BACKGROUND

Mobile devices, such as smart phones, personal digital assistants, tablet computers, other types of mobile and non-mobile computing devices, are becoming increasingly popular. More and more people are using mobile devices in personal and business settings for a variety of purposes. As more people use mobile devices, more and more mobile applications are being designed by application developers. These application developers may develop authentication methods for their applications or for other developer's applications, which may be used to validate users and devices. However, these application developers might not be able to implement their authentication protocols on enterprise managed applications running on mobile device operating systems like iOS and Android.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

In view of the above background, there is a need to allow third party application developers to implement their own authentication protocols for their enterprise managed applications, while preserving the enterprise's authentication protocols and allowing innovation in authentication technology that can be applied to enterprise authentication. For example, a user may desire to use a third party's authentication technology for authenticating third party applications that might be managed by an enterprise system. Therefore, in order to overcome limitations in the prior art described above, and to overcome other limitations that will be apparent upon reading and understanding the present specification, aspects described herein are directed towards providing approaches to authenticating and authorizing client devices in enterprise systems via a gateway device.

One or more aspects of the disclosure provide for a method that may include transmitting, by a computing device to an authentication device, a request to authenticate a client device application via a forms login protocol; and retrieving, by the computing device from the authentication device, a first credential form requesting a first authentication credential, wherein the first credential form is generated, by an extension device connected to the authentication device, based on information received from an authentication service associated with the client device application, the extension device being configured with one or more authentication protocols of the authentication service associated with the client device application. The method may also include transmitting, by the computing device to the client device application, the first credential form; receiving, by the computing device from the client device application, the first authentication credential; and transmitting, by the computing device to the authentication service via the extension device, the first authentication credential. The method may also include transmitting, by the computing device and in response to a successful validation of the first authentication credential, an approval of the request made by the client device application to authenticate via the forms login protocol.

One or more aspects of the disclosure provide for a system that includes at least one processor; and at least one memory storing instructions that, when executed by the at least one processor, cause the system to perform one or more steps. The steps the system may perform may include transmitting, by a computing device to an authentication device, a request to authenticate a client device application via a forms login protocol; and retrieving, by the computing device from the authentication device, a first credential form requesting a first authentication credential, wherein the first credential form is generated, by an extension device connected to the authentication device, based on information received from an authentication service associated with the client device application, the extension device being configured with one or more authentication protocols of the authentication service associated with the client device application. The steps may also include transmitting, by the computing device to the client device application, the first credential form; receiving, by the computing device from the client device application, the first authentication credential; and transmitting, by the computing device to the authentication service via the extension device, the first authentication credential. The steps may also include transmitting, by the computing device and in response to a successful validation of the first authentication credential, an approval of the request made by the client device application to authenticate via the forms login protocol.

One or more aspects of the disclosure provide for one or more non-transitory computer-readable storage media having instructions stored thereon, that when executed by one or more processors, may cause the one or more processors to perform steps. The steps that the one or more processors perform may include transmitting, by a computing device to an authentication device, a request to authenticate a client device application via a forms login protocol; and retrieving, by the computing device from the authentication device, a first credential form requesting a first authentication credential, wherein the first credential form is generated, by an extension device connected to the authentication device, based on information received from an authentication service associated with the client device application, the extension device being configured with one or more authentication protocols of the authentication service associated with the client device application. The steps may also include transmitting, by the computing device to the client device application, the first credential form; receiving, by the computing device from the client device application, the first authentication credential; and transmitting, by the computing device to the authentication service via the extension device, the first authentication credential. The steps may also include transmitting, by the computing device and in response to a successful validation of the first authentication credential, an approval of the request made by the client device application to authenticate via the forms login protocol.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards controlling remote access to resources at an enterprise computing system using managed mobile applications at mobile computing devices. An access manager may perform a validation process that determines whether a mobile application requesting access to enterprise resources has accurately identified itself and has not been subsequently altered after installation at the mobile computing device. In this way, the access manager may ensure the mobile application requesting access to the enterprise resource can be trusted and is not attempting to circumvent the security mechanisms used to protect those enterprise resources. As a result, individuals associated with the enterprise may advantageously utilize enterprise resources at their personal mobile devices.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
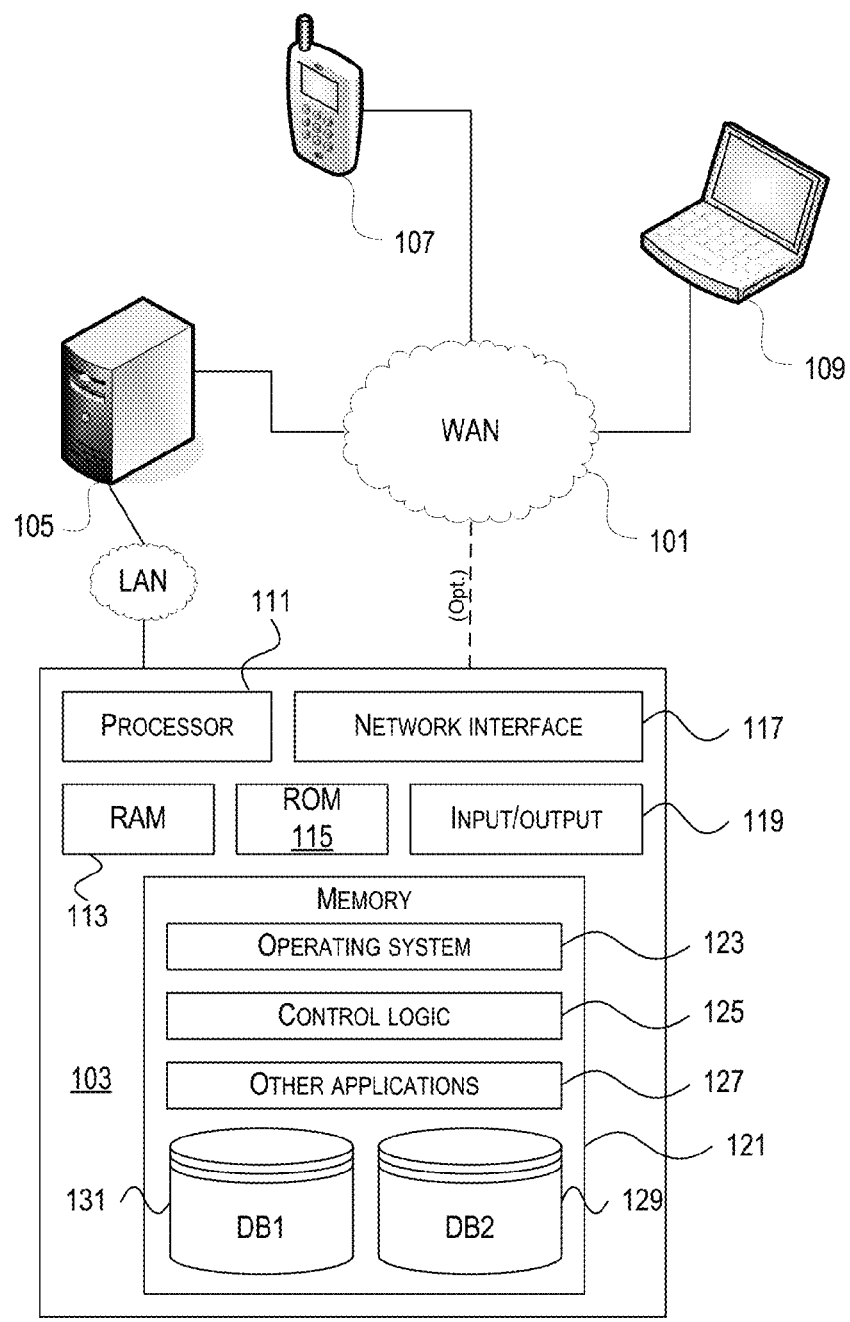
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, LANs, metropolitan area networks (MAN) wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
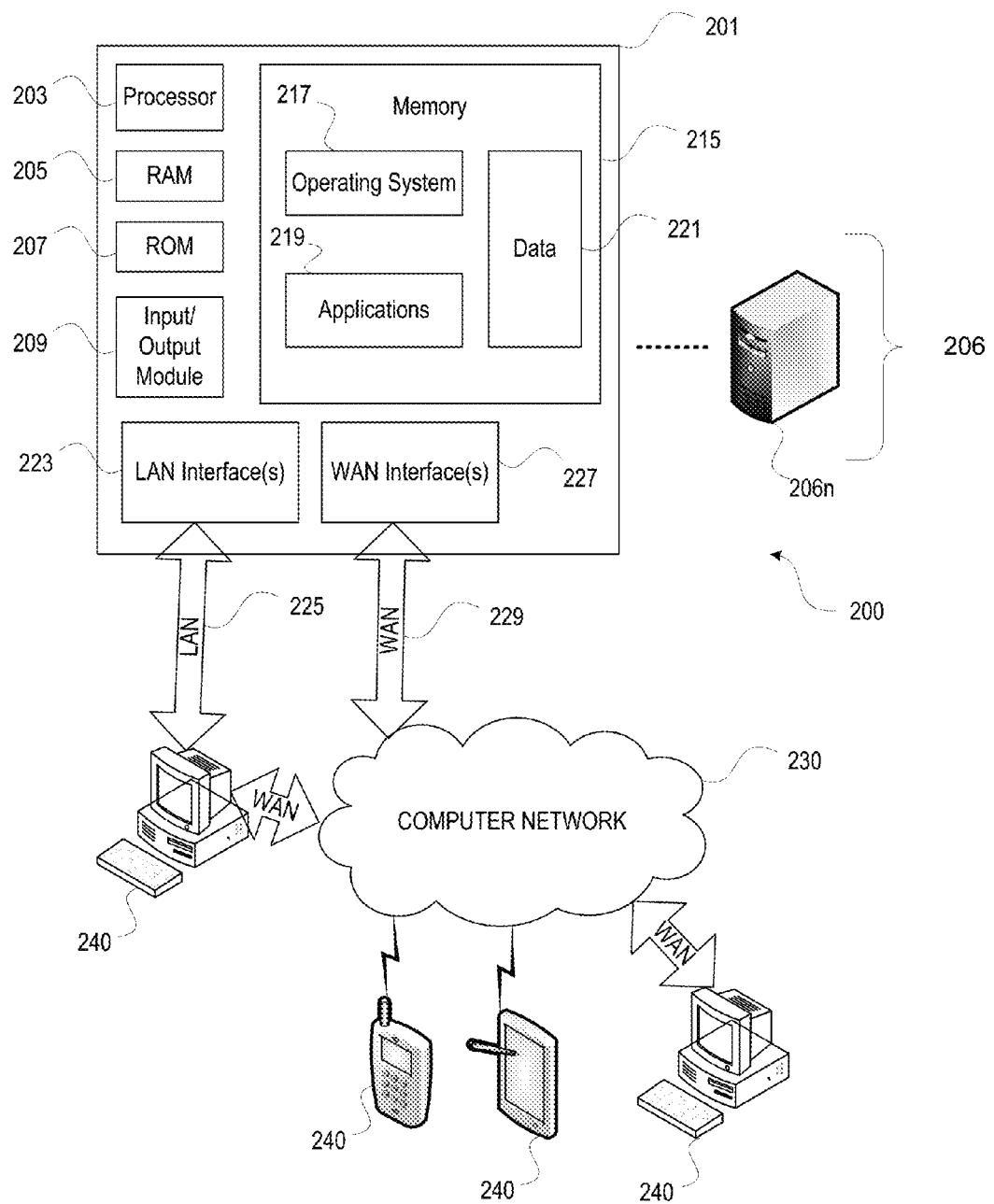
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including RAM 205, ROM 207, I/O module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 106a that receives requests from a client machine 240, forwards the request to a second server 106b, and responds to the request generated by the client machine 240 with a response from the second server 106b. First server 106a may acquire an enumeration of applications available to the client machine 240 and well as address information associated with an application server 206 hosting an application identified within the enumeration of applications. First server 106a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Enterprise Mobility Management Architecture

Figure 3:
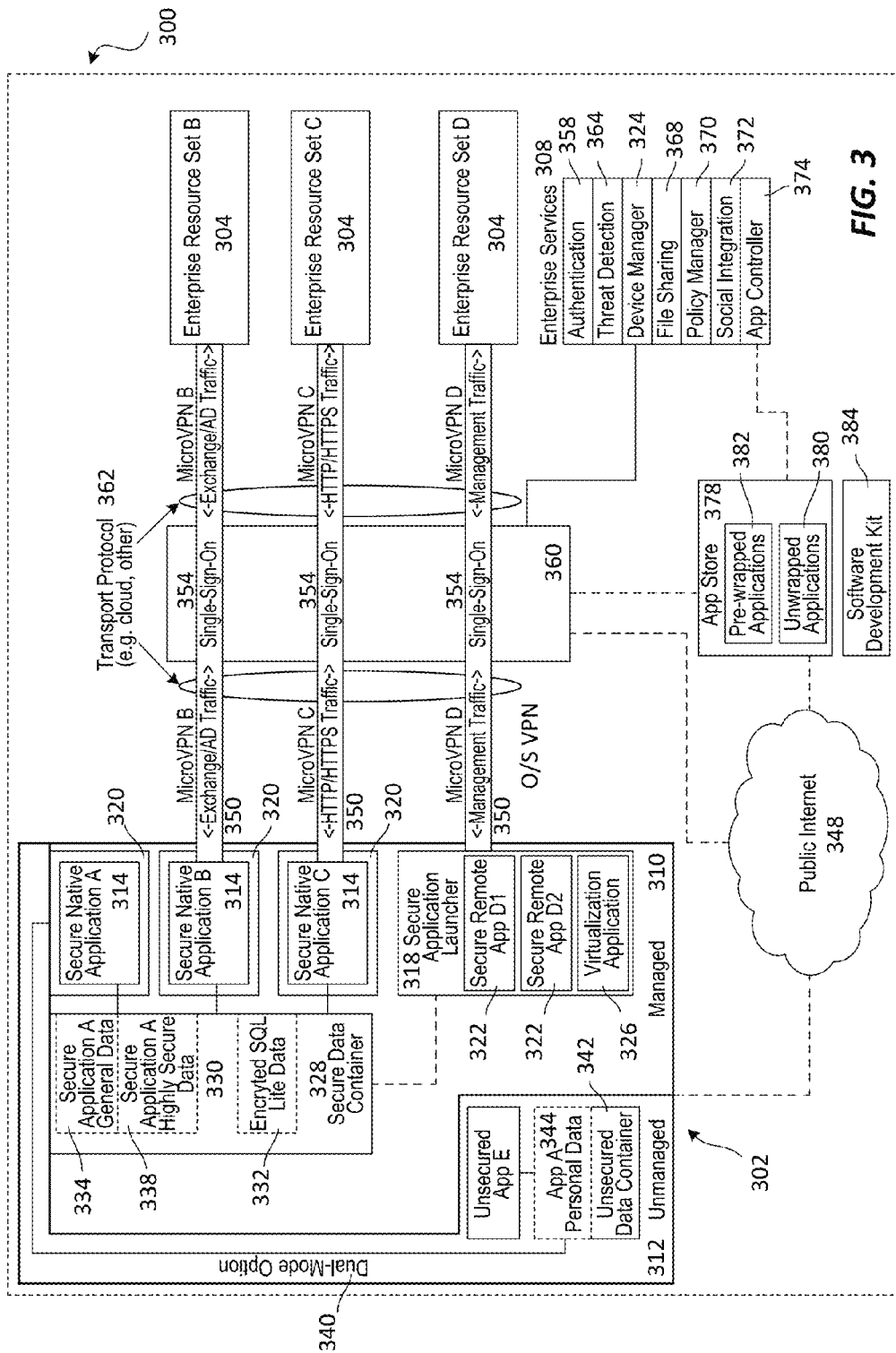
FIG. 3 depicts an illustrative enterprise mobility management system.

FIG. 3 represents an enterprise mobility technical architecture 300 for use in a BYOD environment. The architecture enables a user of a client device (e.g., mobile device) 302 to both access enterprise or personal resources from a mobile device 302 and use the mobile device 302 for personal use. The user may access such enterprise resources 304 or enterprise services 308 using a mobile device 302 that is purchased by the user or a mobile device 302 that is provided by the enterprise to user. The user may utilize the mobile device 302 for business use only or for business and personal use. The mobile device may run an iOS operating system, and Android operating system, or the like. The enterprise may choose to implement policies to manage the mobile device 302. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 304 that is managed through the application of mobile device management policies may be referred to as an enrolled device.

In some embodiments, the operating system of the mobile device may be separated into a managed partition 310 and an unmanaged partition 312. The managed partition 310 may have policies applied to it to secure the applications running on and data stored in the managed partition. The applications running on the managed partition may be secure applications. In other embodiments, all applications may execute in accordance with a set of one or more policy files received separate from the application, and which define one or more security parameters, features, resource restrictions, and/or other access controls that are enforced by the mobile device management system when that application is executing on the device. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps may be restricted to only be able to communicate with other managed apps and trusted enterprise resources, thereby creating a virtual partition that is impenetrable by unmanaged apps and devices.

The secure applications may be email applications, web browsing applications, software-as-a-service (SaaS) access applications, Windows Application access applications, and the like. The secure applications may be secure native applications 314, secure remote applications 322 executed by a secure application launcher 318, virtualization applications 326 executed by a secure application launcher 318, and the like. The secure native applications 314 may be wrapped by a secure application wrapper 320. The secure application wrapper 320 may include integrated policies that are executed on the mobile device 302 when the secure native application is executed on the device. The secure application wrapper 320 may include meta-data that points the secure native application 314 running on the mobile device 302 to the resources hosted at the enterprise that the secure native application 314 may require to complete the task requested upon execution of the secure native application 314. The secure remote applications 322 executed by a secure application launcher 318 may be executed within the secure application launcher application 318. The virtualization applications 326 executed by a secure application launcher 318 may utilize resources on the mobile device 302, at the enterprise resources 304, and the like. The resources used on the mobile device 302 by the virtualization applications 326 executed by a secure application launcher 318 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 304, and the like. The resources used at the enterprise resources 304 by the virtualization applications 326 executed by a secure application launcher 318 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a graphical user interface (GUI) and communicate them to a server application where the server application will use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others might not be prepared or appropriate for deployment on the mobile device so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUIs and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like, thereby providing access to remotely located resources.

The secure applications may access data stored in a secure data container 328 in the managed partition 310 of the mobile device. The data secured in the secure data container may be accessed by the secure wrapped applications 314, applications executed by a secure application launcher 318, virtualization applications 326 executed by a secure application launcher 318, and the like. The data stored in the secure data container 328 may include files, databases, and the like. The data stored in the secure data container 328 may include data restricted to a specific secure application 330, shared among secure applications 332, and the like. Data restricted to a secure application may include secure general data 334 and highly secure data 338. Secure general data may use a strong form of encryption such as Advanced Encryption Standard (AES) 128-bit encryption or the like, while highly secure data 338 may use a very strong form of encryption such as AES 256-bit encryption. Data stored in the secure data container 328 may be deleted from the device upon receipt of a command from the device manager 324. The secure applications may have a dual-mode option 340. The dual mode option 340 may present the user with an option to operate the secured application in an unsecured or unmanaged mode. In an unsecured or unmanaged mode, the secure applications may access data stored in an unsecured data container 342 on the unmanaged partition 312 of the mobile device 302. The data stored in an unsecured data container may be personal data 344. The data stored in an unsecured data container 342 may also be accessed by unsecured applications that are running on the unmanaged partition 312 of the mobile device 302. The data stored in an unsecured data container 342 may remain on the mobile device 302 when the data stored in the secure data container 328 is deleted from the mobile device 302. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device may connect to enterprise resources 304 and enterprise services 308 at an enterprise, to the public Internet 348, and the like. The mobile device may connect to enterprise resources 304 and enterprise services 308 through virtual private network connections. The virtual private network connections, also referred to as microVPN or application-specific VPN, may be specific to particular applications 350, particular devices, particular secured areas on the mobile device, and the like. For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 354. The single-sign-on processes may allow a user to provide a single set of authentication credentials, which are then verified by an authentication service 358. The authentication service 358 may then grant to the user access to multiple enterprise resources 304, without requiring the user to provide authentication credentials to each individual enterprise resource 304.

The virtual private network connections may be established and managed by an access gateway 360. The access gateway 360 may include performance enhancement features that manage, accelerate, and improve the delivery of enterprise resources 304 to the mobile device 302. The access gateway may also re-route traffic from the mobile device 302 to the public Internet 348, enabling the mobile device 302 to access publicly available and unsecured applications that run on the public Internet 348. The mobile device may connect to the access gateway via a transport network 362. The transport network 362 may be a wired network, wireless network, cloud network, local area network, metropolitan area network, wide area network, public network, private network, and the like.

The enterprise resources 304 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 304 may be premise-based resources, cloud based resources, and the like. The enterprise resources 304 may be accessed by the mobile device 302 directly or through the access gateway 360. The enterprise resources 304 may be accessed by the mobile device 302 via a transport network 362. The transport network 362 may be a wired network, wireless network, cloud network, local area network, metropolitan area network, wide area network, public network, private network, and the like.

The enterprise services 308 may include authentication services 358, threat detection services 364, device manager services 324, file sharing services 368, policy manager services 370, social integration services 372, application controller services 374, and the like. Authentication services 358 may include user authentication services, device authentication services, application authentication services, data authentication services and the like. Authentication services 358 may use certificates. The certificates may be stored on the mobile device 302, by the enterprise resources 304, and the like. The certificates stored on the mobile device 302 may be stored in an encrypted location on the mobile device, the certificate may be temporarily stored on the mobile device 302 for use at the time of authentication, and the like.

Threat detection services 364 may include intrusion detection services, unauthorized access attempt detection services, and the like. Unauthorized access attempt detection services may include unauthorized attempts to access devices, applications, data, and the like. Device management services 324 may include configuration, provisioning, security, support, monitoring, reporting, and decommissioning services. File sharing services 368 may include file management services, file storage services, file collaboration services, and the like. Policy manager services 370 may include device policy manager services, application policy manager services, data policy manager services, and the like. Social integration services 372 may include contact integration services, collaboration services, integration with social networks such as Facebook, Twitter, and LinkedIn, and the like. Application controller services 374 may include management services, provisioning services, deployment services, assignment services, revocation services, wrapping services, and the like.

The enterprise mobility technical architecture 300 may include an application store 378. The application store 378 may include unwrapped applications 580, pre-wrapped applications 382, and the like. Applications may be populated in the application store 378 from the application controller 374. The application store 378 may be accessed by the mobile device 302 through the access gateway 360, through the public Internet 348, or the like. The application store may be provided with an intuitive and easy to use User Interface.

A software development kit 384 may provide a user the capability to secure applications selected by the user by wrapping the application as described previously in this description. An application that has been wrapped using the software development kit 384 may then be made available to the mobile device 302 by populating it in the application store 378 using the application controller 374.

The enterprise mobility technical architecture 300 may include a management and analytics capability 388. The management and analytics capability 388 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 4:
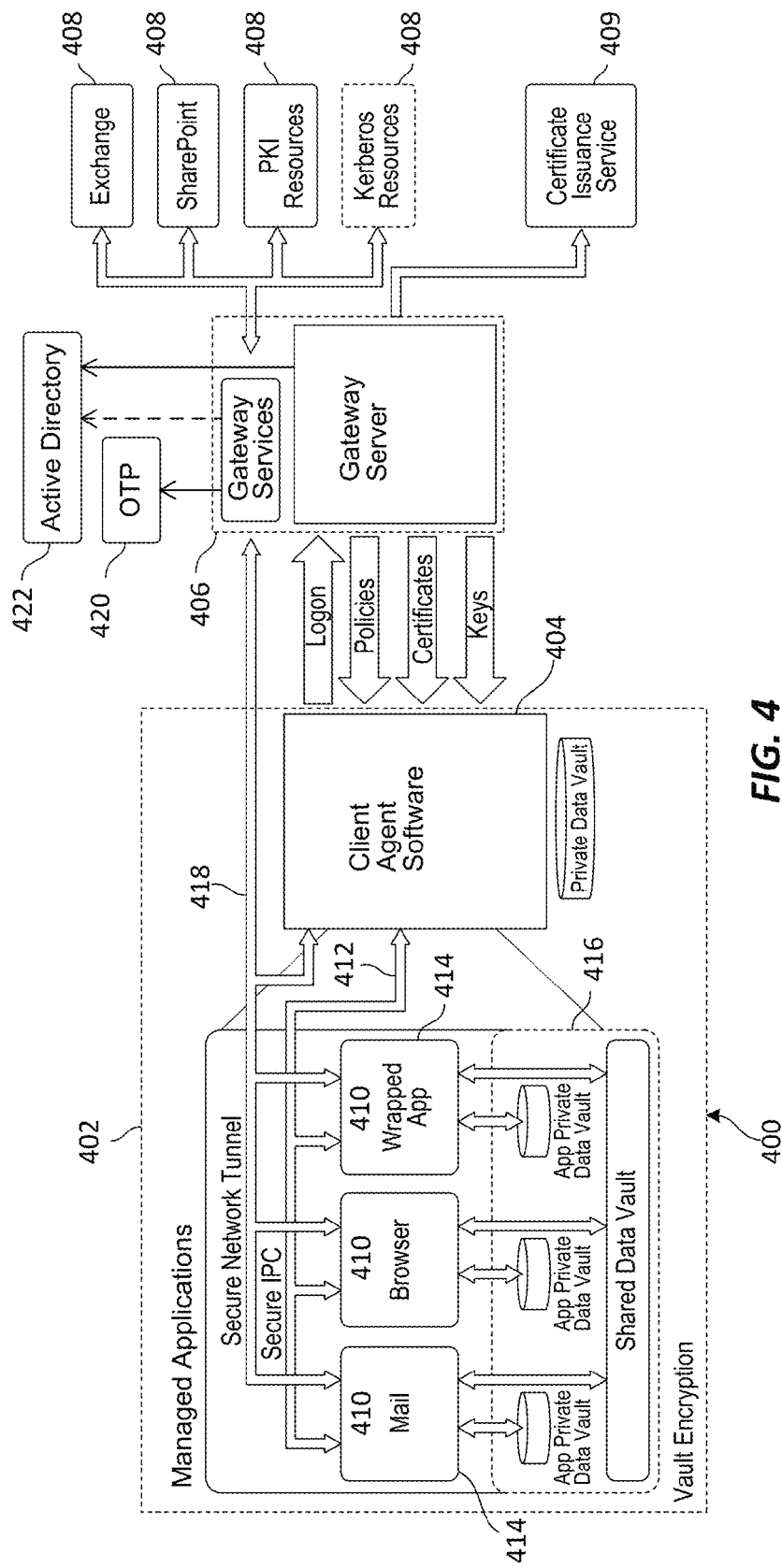
FIG. 4 depicts another illustrative enterprise mobility management system.

FIG. 4 is another illustrative enterprise mobility management system 400. Some of the components of the mobility management system 300 described above with reference to FIG. 3 have been omitted for the sake of simplicity. The architecture of the system 400 depicted in FIG. 4 is similar in many respects to the architecture of the system 300 described above with reference to FIG. 3 and may include additional features not mentioned above.

In this case, the left hand side represents an enrolled client device (e.g., mobile device) 402 with a client agent 404, which interacts with gateway server 406 (which includes Access Gateway and application controller functionality) to access various enterprise resources 408 and services 609 such as Exchange, Sharepoint, public-key infrastructure (PKI) Resources, Kerberos Resources, Certificate Issuance service, as shown on the right hand side above. Although not specifically shown, the mobile device 402 may also interact with an enterprise application store (StoreFront) for the selection and downloading of applications.

The client agent 404 acts as the UI (user interface) intermediary for Windows apps/desktops hosted in an Enterprise data center, which are accessed using the High-Definition User Experience (HDX)/ICA display remoting protocol. The client agent 404 also supports the installation and management of native applications on the mobile device 402, such as native iOS or Android applications. For example, the managed applications 410 (mail, browser, wrapped application) shown in the figure above are all native applications that execute locally on the device. Client agent 404 and application management framework of this architecture act to provide policy driven management capabilities and features such as connectivity and SSO (single sign on) to enterprise resources/services 408. The client agent 404 handles primary user authentication to the enterprise, normally to Access Gateway (AG) with SSO to other gateway server components. The client agent 404 obtains policies from gateway server 406 to control the behavior of the managed applications 410 on the mobile device 402.

The Secure interprocess communication (IPC) links 412 between the native applications 410 and client agent 404 represent a management channel, which allows client agent to supply policies to be enforced by the application management framework 414 "wrapping" each application. The IPC channel 412 also allows client agent 404 to supply credential and authentication information that enables connectivity and SSO to enterprise resources 408. Finally the IPC channel 412 allows the application management framework 414 to invoke user interface functions implemented by client agent 404, such as online and offline authentication.

Communications between the client agent 404 and gateway server 406 are essentially an extension of the management channel from the application management framework 414 wrapping each native managed application 410. The application management framework 414 requests policy information from client agent 404, which in turn requests it from gateway server 406. The application management framework 414 requests authentication, and client agent 404 logs into the gateway services part of gateway server 406 (also known as NetScaler Access Gateway). Client agent 404 may also call supporting services on gateway server 406, which may produce input material to derive encryption keys for the local data vaults 416, or provide client certificates which may enable direct authentication to PKI protected resources, as more fully explained below.

In more detail, the application management framework 414 "wraps" each managed application 410. This may be incorporated via an explicit build step, or via a post-build processing step. The application management framework 414 may "pair" with client agent 404 on first launch of an application 410 to initialize the Secure IPC channel and obtain the policy for that application. The application management framework 414 may enforce relevant portions of the policy that apply locally, such as the client agent login dependencies and some of the containment policies that restrict how local OS services may be used, or how they may interact with the application 410.

The application management framework 414 may use services provided by client agent 404 over the Secure IPC channel 412 to facilitate authentication and internal network access. Key management for the private and shared data vaults 416 (containers) may be also managed by appropriate interactions between the managed applications 410 and client agent 404. Vaults 416 may be available only after online authentication, or may be made available after offline authentication if allowed by policy. First use of vaults 416 may require online authentication, and offline access may be limited to at most the policy refresh period before online authentication is again required.

Network access to internal resources may occur directly from individual managed applications 410 through Access Gateway 406. The application management framework 414 is responsible for orchestrating the network access on behalf of each application 410. Client agent 404 may facilitate these network connections by providing suitable time limited secondary credentials obtained following online authentication. Multiple modes of network connection may be used, such as reverse web proxy connections and end-to-end VPN-style tunnels 418.

The Mail and Browser managed applications 410 have special status and may make use of facilities that might not be generally available to arbitrary wrapped applications. For example, the Mail application may use a special background network access mechanism that allows it to access Exchange over an extended period of time without requiring a full AG logon. The Browser application may use multiple private data vaults to segregate different kinds of data.

This architecture supports the incorporation of various other security features. For example, gateway server 406 (including its gateway services) in some cases will not need to validate active directory (AD) passwords. It can be left to the discretion of an enterprise whether an AD password is used as an authentication factor for some users in some situations. Different authentication methods may be used if a user is online or offline (i.e., connected or not connected to a network).

Step up authentication is a feature wherein gateway server 406 may identify managed native applications 410 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 416 (containers) on the mobile device 402. The vaults 416 may be encrypted so that all on-device data including files, databases, and configurations are protected. For on-line vaults, the keys may be stored on the server (gateway server 406), and for off-line vaults, a local copy of the keys may be protected by a user password or biometric validation. When data is stored locally on the device 402 in the secure container 416, it is preferred that a minimum of AES 256 encryption algorithm be utilized.

Other secure container features may also be implemented. For example, a logging feature may be included, wherein all security events happening inside an application 410 are logged and reported to the backend. Data wiping may be supported, such as if the application 410 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 414 may be prevented in other ways. For example, when an application 410 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 420 without the use of an AD (active directory) 422 password for access to one or more applications. In some cases, some users do not know (or are not permitted to know) their AD password, so these users may authenticate using an OTP 420 such as by using a hardware OTP system like SecurID (OTPs may be provided by different vendors also, such as Entrust or Gemalto). In some cases, after a user authenticates with a user ID, a text is sent to the user with an OTP 420. In some cases, this may be implemented only for online use, with a prompt being a single field.

An offline password may be implemented for offline authentication for those applications 410 for which offline use is permitted via enterprise policy. For example, an enterprise may want StoreFront to be accessed in this manner. In this case, the client agent 404 may require the user to set a custom offline password and the AD password is not used. Gateway server 406 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 410 as secondary credentials (for the purpose of accessing PKI protected web resources via the application management framework micro VPN feature). For example, an application may utilize such a certificate. In this case, certificate-based authentication using ActiveSync protocol may be supported, wherein a certificate from the client agent 404 may be retrieved by gateway server 406 and used in a keychain. Each managed application may have one associated client certificate, identified by a label that is defined in gateway server 406.

Gateway server 406 may interact with an Enterprise special purpose web service to support the issuance of client certificates to allow relevant managed applications to authenticate to internal PKI protected resources.

The client agent 404 and the application management framework 414 may be enhanced to support obtaining and using client certificates for authentication to internal PKI protected network resources. More than one certificate may be supported, such as to match various levels of security and/or separation requirements. The certificates may be used by the Mail and Browser managed applications, and ultimately by arbitrary wrapped applications (provided those applications use web service style communication patterns where it is reasonable for the application management framework to mediate https requests).

Application management client certificate support on iOS may rely on importing a public-key cryptography standards (PKCS) 12 BLOB (Binary Large Object) into the iOS keychain in each managed application for each period of use. Application management framework client certificate support may use a HTTPS implementation with private in-memory key storage. The client certificate will never be present in the iOS keychain and will not be persisted except potentially in "online-only" data value that is strongly protected.

Mutual SSL may also be implemented to provide additional security by requiring that a mobile device 402 is authenticated to the enterprise, and vice versa. Virtual smart cards for authentication to gateway server 406 may also be implemented.

Both limited and full Kerberos support may be additional features. The full support feature relates to an ability to do full Kerberos login to Active Directory (AD) 422, using an AD password or trusted client certificate, and obtain Kerberos service tickets to respond to HTTP Negotiate authentication challenges. The limited feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when http (but not https) connections are proxied in VPN and MicroVPN mode.

Another feature relates to application container locking and wiping, which may automatically occur upon jail-break or rooting detections, and occur as a pushed command from administration console, and may include a remote wipe functionality even when an application 410 is not running.

A multi-site architecture or configuration of enterprise application store and an application controller may be supported that allows users to be service from one of several different locations in case of failure.

In some cases, managed applications 410 may be allowed to access a certificate and private key via an API (example OpenSSL). Trusted managed applications 410 of an enterprise may be allowed to perform specific Public Key operations with an application's client certificate and private key.

Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

Illustrative Embodiments

Figure 5:
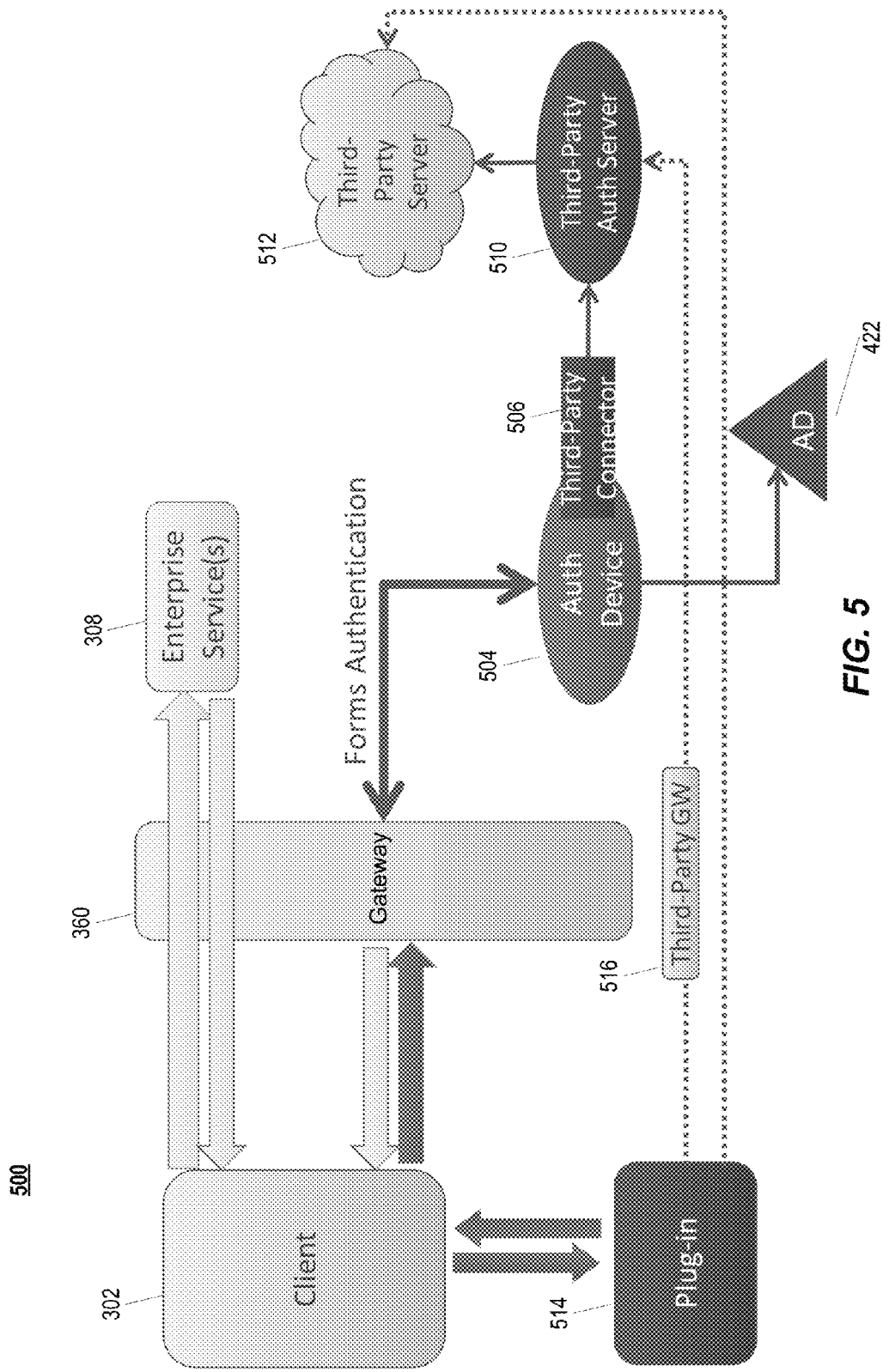
FIG. 5 depicts an illustrative diagram showing an example system in accordance with one or more features described herein.
Figure 6:
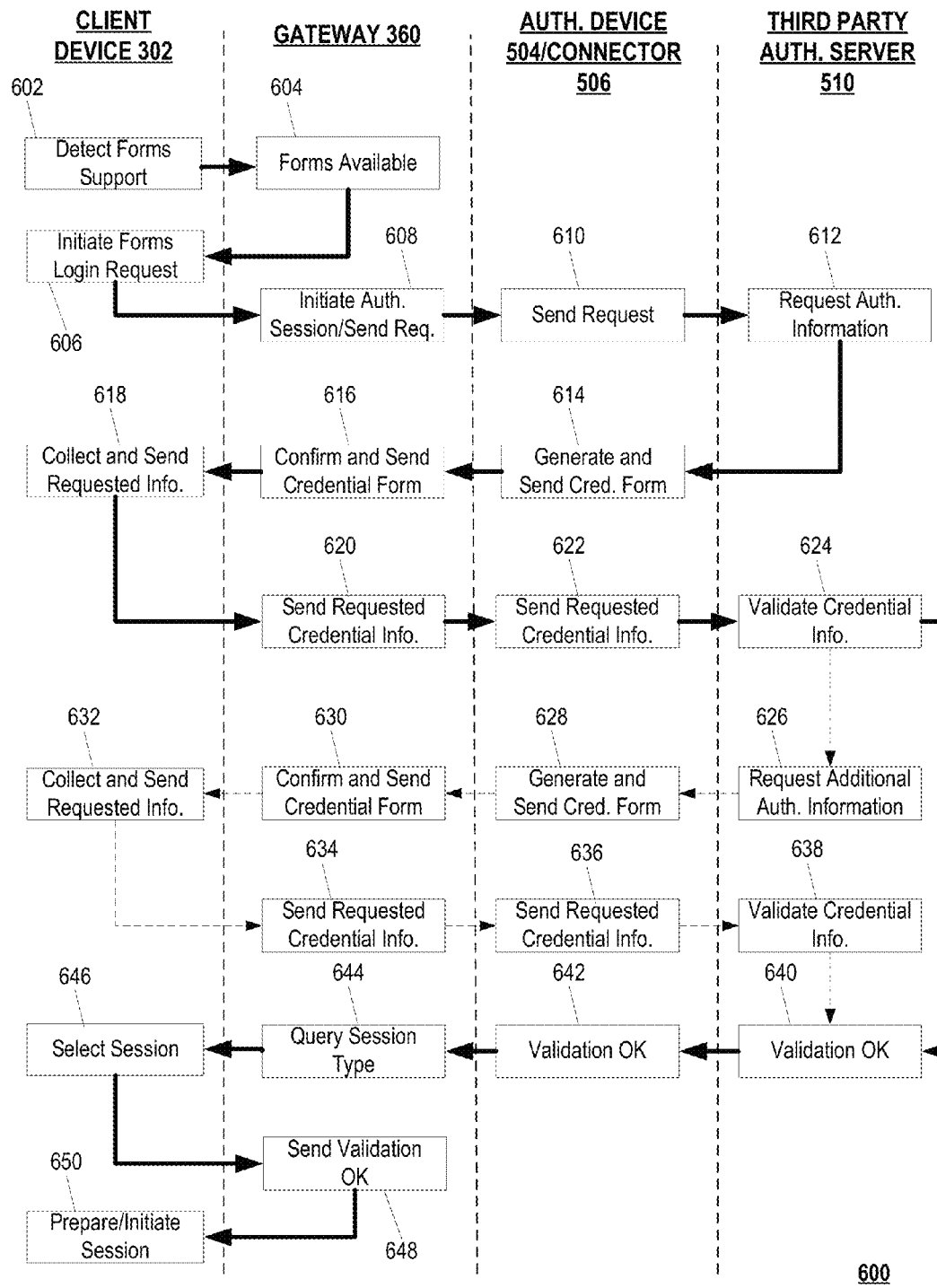
FIG. 6 depicts an illustrative flow diagram showing an example process of authenticating a client device on an enterprise system via third party authentication support in accordance with one or more features described herein.
Figure 7:
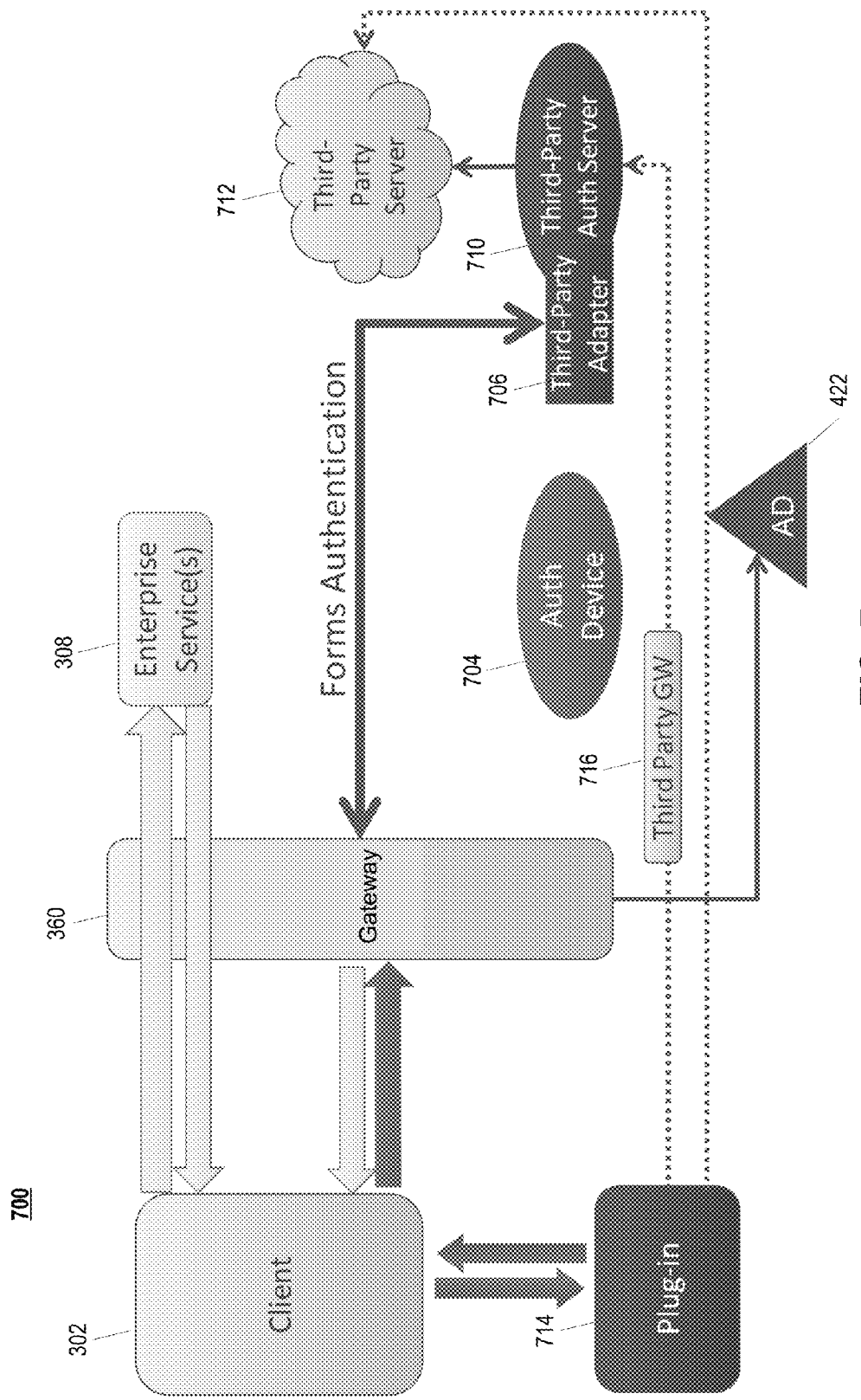
FIG. 7 depicts an illustrative diagram showing an example system in accordance with one or more features described herein.
Figure 8:
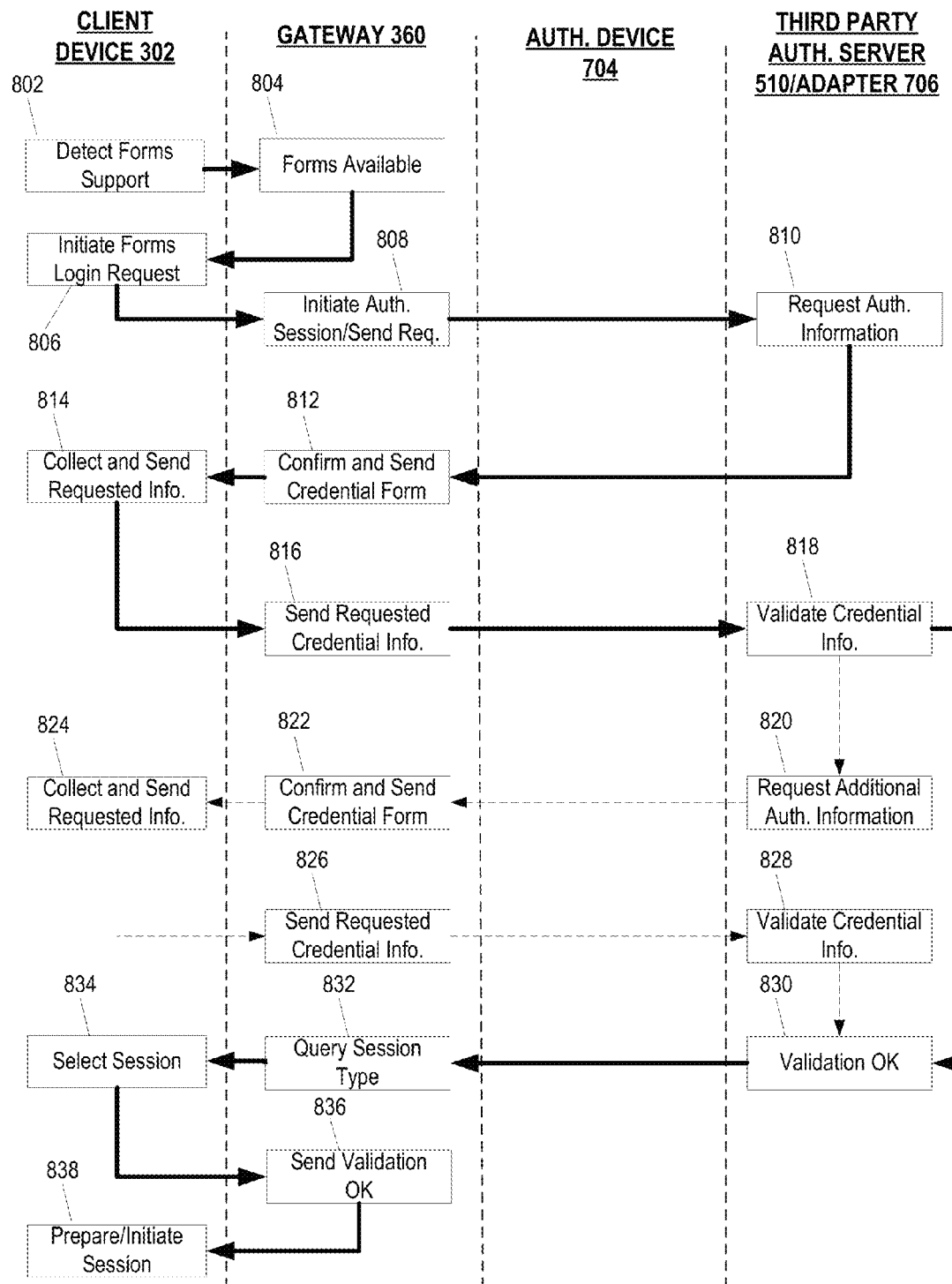
FIG. 8 depicts an illustrative flow diagram showing an example process of authenticating a client device on an enterprise system via third party authentication support in accordance with one or more features described herein.
Figure 9:
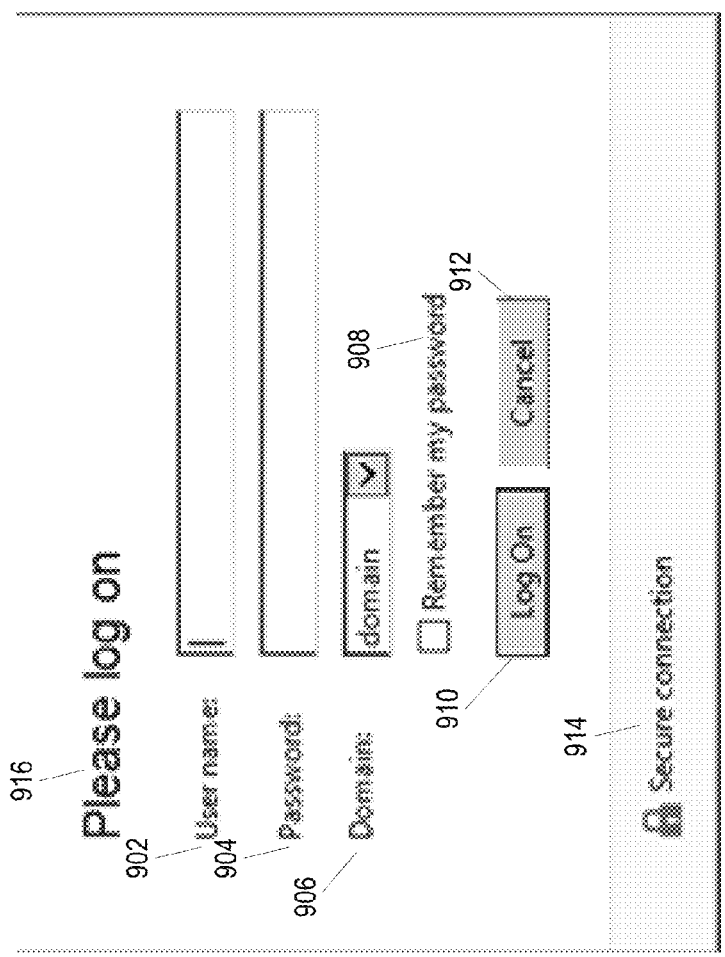
FIG. 9 depicts an illustrative user interface in accordance with one or more features described herein.
Figure 10:
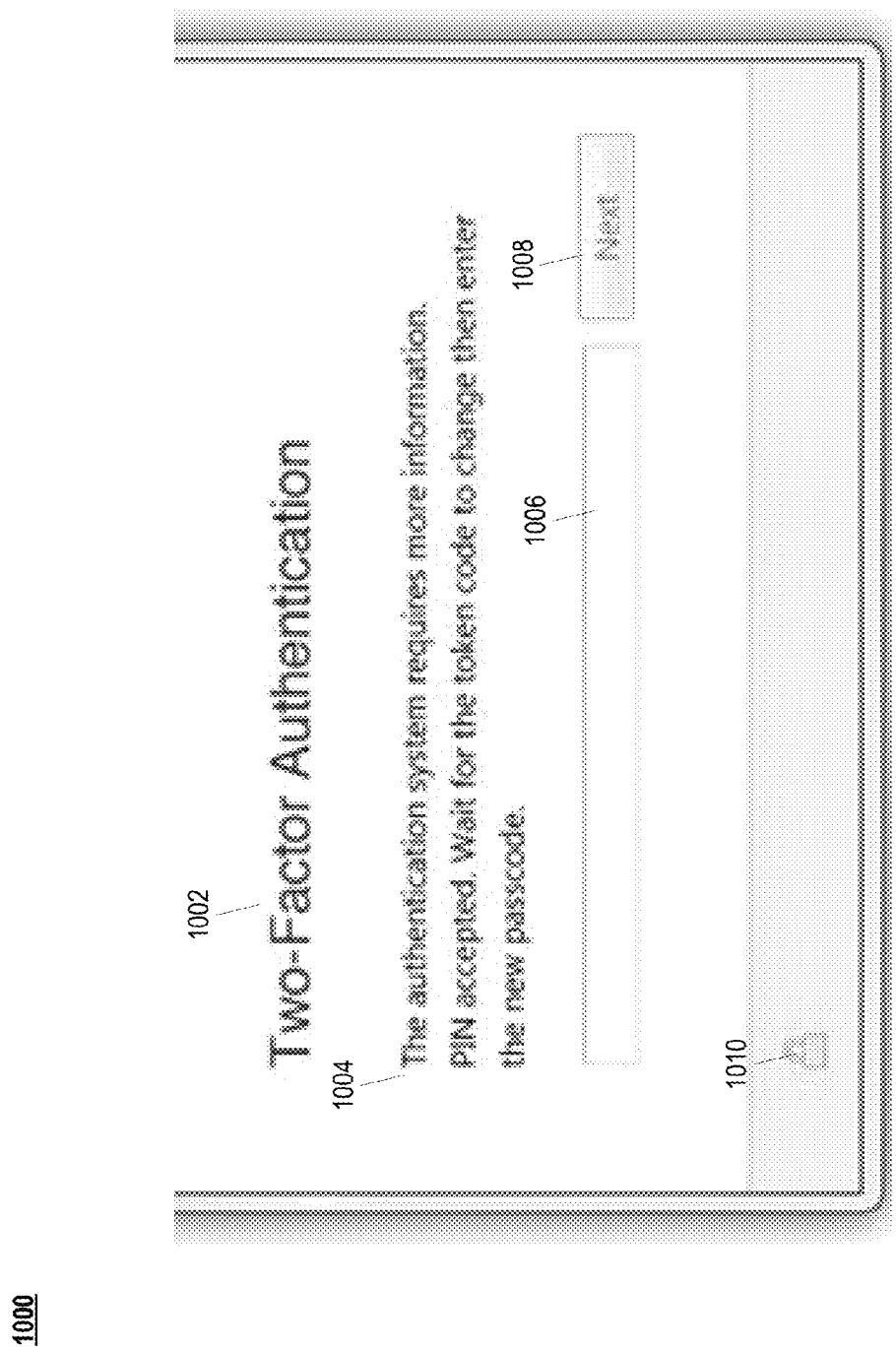
FIG. 10 depicts an illustrative user interface in accordance with one or more features described herein.
Figure 11:
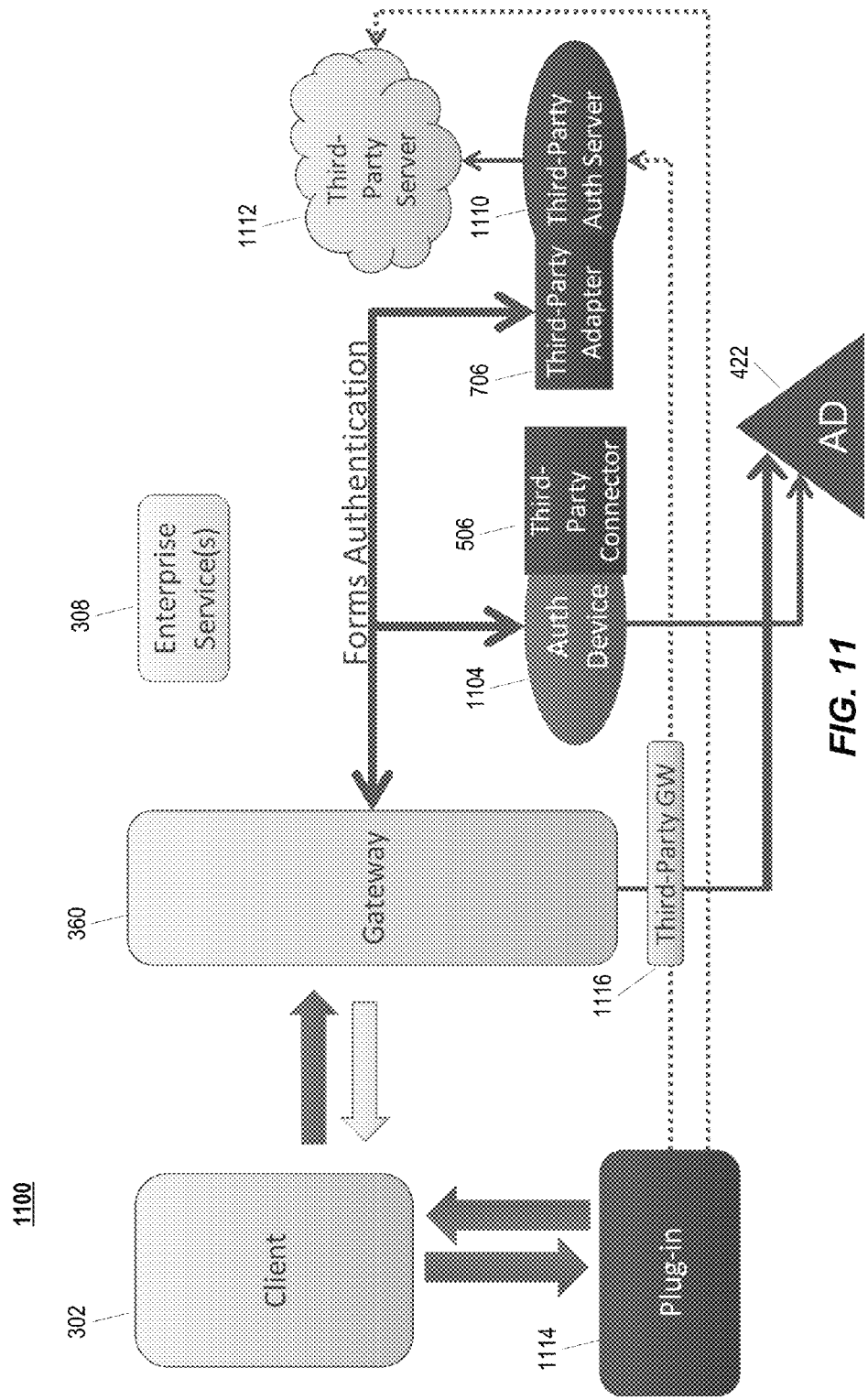
FIG. 11 depicts an illustrative diagram showing an example system in accordance with one or more features described herein.

FIGS. 5, 7 and 11 are illustrative schematic system diagrams, FIGS. 6 and 8 are illustrative schematic flow diagrams, and FIGS. 9 and 10 are illustrative schematics of user interfaces, all of which illustrate various examples of features, methods, and systems of enterprise authentication via third party authentication support. The features and methods described below in reference to FIGS. 5-11 may be performed by a computing device or combination of devices, such as the various computing devices and systems shown in FIGS. 1-4, and may be implemented within various different types of enterprise systems, such as the illustrative systems shown in FIGS. 3 and 4, or any other enterprise system (i.e., any computing device or application that may require authentication when providing access to resources). The features, steps, and methods described below in reference to FIGS. 5-11 may be performed in other than the recited order, and one or more features, steps, or methods may omitted and/or added. FIGS. 5-11 relate to authenticating a user, client device, and/or application on a gateway, an enterprise system (e.g., via an authentication device), and/or a third party authentication device (e.g., an authentication server for a third party application running on a client device). For example, a user at terminal 240 or client device 302 or 402 running an application may communicate with an enterprise system through gateway 360 or 406, may provide authentication credentials to validate the user's, client device's, or application's identity, and then may request and access the various resources and services of the enterprise system. FIGS. 5-11 may use various protocols, such as Security Assertion Markup Language (SAML), which is an XML-based method for exchanging authentication and authorization information. Any of the disclosed steps in FIGS. 6 and 8 may be omitted, be performed in other than the recited order, repeated, and/or combined.

Some embodiments may support third parties (e.g., vendors, application developers, etc.) that may develop authentication methods for third party applications (e.g., managed applications). These third parties may require evidence/credential information before authenticating a client device or user. These third party authentication methods may support step-up authentication methods. Accordingly, disclosed embodiments allow a client device to pair with a third party authentication service/system (e.g., for a third party application) as well as pair with an enterprise authentication device/service.

Disclosed embodiments allow for the generation and processing of authentication forms on a delegated forms service or extension. According to some aspects, these forms may be XML forms transmitted over HTTP or HTTPS. The flow of forms and responses between client devices, gateway devices, authentication devices, and the like may constitute conversations that contain sensitive information, such as passwords or other authentication information. A form request may include mutual authentication between a delegated forms client and server. Requests may exchange key material that may enable form responses to be encrypted, even if SSL transport security might be enabled and/or used. According to some aspects, once mutual authentication and key exchange have occurred, a session context may be established, which may be used to encrypt/decrypt messages between a client and server. This encryption may shield user or client device credentials from other systems that may decrypt the SSL transport layer, such as an intrusion detection system. In some cases, after a conversation has terminated, the session context (including encryption objects) may be discarded or destroyed.

Some embodiments may support a forms authentication protocol, which may allow third parties to express a wide range of authentication forms configured for many platforms and operating systems using a set of user interface constructs. These third parties may extend enterprise authentication methods (e.g., used or supported by enterprise resources and services) by implementing server logic that may emit and/or consume forms defined in a forms language. This form language and related protocols may be supported by native user-agents (e.g., applications running on client devices) and/or any operating system.

Some embodiments allow for client device capability information to be passed in messages between one or more services or devices. This information may be provided in HTTP headers attached to messages. This capability information may include user agent, language capability, credential type information, label types, storage information, client address, key exchange information, and the like. In some embodiments, a client session may be identified by examining a header of a message, which may include session identifying information. The client type element may include information that provides an indication of the capabilities of the session being created (e.g., whether the session is VPN, CVPN, etc. capable), how URLs should be re-written in order to access a server behind a gateway (e.g., enterprise servers), and may include information that may need to be supplied to a gateway to set a session type (which will be described below in more detail).

Some embodiments allow for the generation of session cookies to support login conversations with the client device, which may be kept separate from one another so as not to mix up various sessions. For example, a cookie may be a small piece of data sent from a gateway and stored on a client device. The cookie may be a HTTP cookie, web cookie, browser cookie, and the like. The cookie may identify a current session (such as a logged-in or gateway session session) of a client device. Session cookies may be generally short lived evidence that the current caller (e.g., the client device) is the same as a previous caller. Session cookies may be generally short lived so that if, for example, the client device is lost or stolen, an attacker cannot continue to log in the gateway/enterprise. In some embodiments, a gateway (or other disclosed component) may attach to and/or associate an expiration with a session cookie. For example, a cookie may have a time limit of 5 minutes, such that after 5 minutes, the current login session may be disabled, and a client device may need to subsequently log back in to a gateway (or other disclosed component). In some embodiments, other session information may be used, such as a token.

FIG. 5 is an illustrative system 500 that may implement one or more features described herein. System 500 may include client device 302 (e.g., from FIG. 3), which may be a computing device or user device, and may be similar to or instead be terminal 240 or enrolled mobile device 402. In some instances, client device 302 may include software (e.g., a client application) running on client device 302. According to some aspects, whenever client device 302 is referred to herein, such references may refer to a computing device or to an application running on (and/or otherwise associated with) client device 302. Client device 302 may communicate with enterprise services 308 (e.g., from FIG. 3). Enterprise services 308 may include services such as an application controller 374, application store 378, enterprise resources 304, and the like. Client device 302 may communicate with a gateway 360, which may be the same as gateway 360 in FIG. 3 and/or similar to gateway 406. Gateway 360 may be a secure server, and may be implemented as one or more separate computing devices. Alternatively, gateway 360 may be implemented within a server or other computing device providing resources or services (e.g., an email server, a web application server, etc.). Gateway 360 may support various additional authentication techniques, such as password-based, token-based (e.g., smart cards, magnetic strip cards, etc.), biometrics (e.g., fingerprint, voice print, iris or retina scanning), risk-based authentication, and the like. The authentication information transmitted in step 502 may be single-factor or multi-factor authentication information. For example, in multi-factor authentication, a user may provide a password and the user's smart card, but might only need to provide one of these in a single-factor authentication. The authentication may also include multiple authentication steps (e.g., challenge questions) and/or mutual authentication techniques. According to some aspects, gateway 360 may be a cloud gateway, an access gateway, and the like.

Client device 302 may communicate (e.g., via gateway 360) with an authentication device 504. For example, client device 302 may attempt to login to authentication device 504 via gateway 360 by sending an authentication request and/or credentials to the authentication service. The authentication request may be an attempt by the client device 302 to log into the enterprise system using a secured and/or unsecured application running on the client device 302, such as a console application, mobile application, web browser, web-based application, or any other application. A user of the client device 302 may input authentication credentials into client device 302 using an input interface/device of client device 302. For example, the user may use a keyboard or touch screen to input a user identifier and/or password into client device 302. Other types of input devices may also be used in accordance with disclosed aspects, such as accelerometers, gyroscopes, and other sensors/devices that can be used to measure biometric aspects of a user's interaction with client device 302. Other input devices may be used as well. The authentication credentials may be encrypted and/or securely transmitted to a gateway (e.g., gateway 360) of the enterprise system and/or to authentication device 504. The credentials may then be transmitted or passed to authentication device 504.

According to some aspects, authentication device 504 may be the same as or similar to authentication service 358, and may be a computing device and/or server. In some cases, authentication device 504 may be an authentication service of (or otherwise associated with) an enterprise resource (e.g., enterprise service 308), such as App Store 378 or App Controller 374. Additionally, authentication device 504 may include various options and protocols for authentication/login methods/types, such as forms-based login, password login, Kerberos login, Smartcard login, and Access Gate Single Sign-On (AG SSO), and the like. It noted that any other login/authentication method may implemented according to aspects disclosed herein. According to some aspects, gateway 360 may, for example, authenticate client devices by presenting the received authentication credentials to an active directory (such as AD 422), which may rule on the accuracy and/or validity of the authentication credentials.

Such authentication may be for authentication client device 302 on an enterprise system, such as system 300 and/or system 400.

Authentication device 504 may include a third-party connector 506 that may communicate with a third-party authentication server 510. Server 510 may be an authentication server configured to receive and validate authentication credentials transmitted by client device 302 (e.g., by an application running on client device 302). Connector 506 may be configured with one or more authentication protocols implemented by server 510. Such authentication protocols may include using risk-based evidence, biometric information, text-based information, speech or sound based information, short message service, knowledge-based authentication, or any other type of authentication information or evidence. Connector 506 may be part of authentication device 504 or may be a separate component (e.g., separate computing device). Connector 506 may be based on an authentication extension configured with a software development kit (SDK).

Server 510 may provide information, such as required authentication information requested from client device 302, to authentication device 504 via connector 506. Connector 506 may use this information received from server 510 to generate items (e.g., forms, challenges, questions, etc.) which may be passed from authentication device 504 to client device 302 via gateway 360. According to some aspects, after client device 302 receives this requested authentication information, a script or program, such as a plug-in 514 or application, located on client device 302 (or remote to client device 302) may invoke the third party authentication protocol (e.g., biometric authentication). Plugin 514 may request the requested authentication information from, for example, a user of client device 302. For example, a user interface may be presented on client device 302 that may request a user input the requested authentication information. According to some aspects, such a user interface may be presented on client device 302 in an auditory or visual manner. For example, if a finger print sample is requested as the authentication information, plug-in 514 may display a user interface that requests a finger print sample and may select a corresponding fingerprint reader or scanner to collect the fingerprint. Plug-in 514 may retrieve (e.g., via a third-party gateway device 516) the user interface information from server 510 and/or server 512.

FIG. 6 is an illustrative process 600 illustrating a flow schematic of client authentication via third party authentication support in accordance with one or more features described herein. Process 600 may be performed by a system, such as system 500. For example, in one or more embodiments, the process 600 illustrated in FIG. 6 and/or one or more steps thereof may be performed by a computing device (e.g., any device of FIGS. 1-5). In other embodiments, the process illustrated in FIG. 6 and/or one or more steps thereof may be embodied in computer-executable instructions that are stored in a computer-readable medium, such as a non-transitory computer-readable memory. Alternatively or additionally, any of the steps in process 600 may be performed on any client device, gateway device, enterprise server machine, and/or third-party server or computing device. As shown in FIG. 6, system 600 may include a client device 302, a gateway device 360, authentication device 504 and connector 506, and third party authentication server 510.

Process 600 may begin with step 602, in which client device 302 may send a request that may request whether gateway 360 supports a particular type of logon protocol. For example, an application running on client device 302 may wish to authenticate via a forms protocol. Client device 302 may send this request as a POST HTTP message. The message may post to a forms start URL that may include a request to determine gateway 360's authentication requirements, content type (e.g., desired or supported authentication protocol(s)/type(s), such as a forms protocol), user-agent, location/address for the gateway 360, and a host for the gateway 360.

At step 604, gateway 360 may receive this request from client device 302. If gateway 360 does not support a requested authentication protocol (e.g., forms authentication) then gateway 360 may transmit to client device 302 a recognizable HTTP response, such as a 403 Forbidden or 302 Found (e.g., redirection to another URL, such as /vpn/index.html), which may provide a fallback option for client device 302. If gateway 360 does support a requested authentication protocol, then gateway 360 may transmit to client device 302 a response indicating that gateway 360 supports the requested protocol, such as a 200 OK response that may include the content type supported (e.g., forms authentication).

According to some aspects, steps 602 and/or 604 may be implicitly performed as part of a resource access request made by client device 302. In some cases, the resource access request may trigger an authentication challenge by using, for example, HTTP headers to indicate that the client device 302 understands the forms login protocol (or any other authentication protocol).

At step 606, after receiving a response from gateway 360 indicating support of the requested protocol, client device 302 may initiate a login request using the desired authentication protocol. In this example, the logon protocol may be a forms-based authentication protocol. The client device 302 may understand the desired authentication protocol. For example, the client device 302 may run an application or program (e.g., an enterprise application) that may understand the authentication protocol and may communicate with gateway 360 (and/or other components). In another example, the client device 302 may run a web-based application (e.g., a web page) that may run a JavaScript program (e.g., provided by the enterprise) that may understand the authentication protocol. In this example, client device 302 may (e.g., using an enterprise application) embed a webview control to process the logon sequence. For example, an application running on client device 302 may wish to logon to the enterprise system, and client device 302 may initiate this forms login request by transmitting to gateway 360 a GET HTTP request to the common forms start location (e.g., URL). According to some aspects, this request may contain information such as gateway 360's authentication requirements, content type (e.g., desired or supported authentication protocol(s)/type(s), such as a forms protocol), user-agent, location/address for the gateway 360, and a host for the gateway 360. This request may also include encryption key (e.g., key exchange) information. For example, the client device 302 may indicate in the request which version of the forms protocol is understood by client device 302. For example, the client device 302 may identify several compatible versions. According to some aspects, when a form response is sent from the client device 302 to gateway 360 (or from gateway 360 to client device 302), the form values might be encrypted. The encryption (here and any encryption disclosed herein) may be achieved using any type of encryption, such as AES-128 cipher, with a new encryption key agreed between the client device 302 and gateway 360 (or between any disclosed device/component) for each unique conversation. Thus, the key information may include a key exchange scheme that may include parameter names and expected values. According to some aspects, there may be negotiation between the client device 302 and gateway 360 over the key exchange scheme. Once this is agreed upon, additional communications may be encrypted with this key. While a forms-based authentication protocol is described, any other logon/authentication protocol may be used.

According to some embodiments, gateway 360 may perform a pre-authentication scan (e.g., Endpoint Analysis (EPA) scan) of client device 302, such as before step 606. This scan may use a similar protocol as described for risk-based authentication further herein. This scan may check whether client device 302 comprises a clean enough environment to initiate authentication with gateway 360 (e.g., checks to see if client device 302 has up to date system patches, anti-virus software running, etc.). This scan may be performed without notifying or displaying a user interface to a user. According to some aspects, if gateway 360 needs extra information from client device 302 (e.g., if gateway 360 cannot perform scanning by inspecting request headers), then gateway 360 may transmit a form to client device 302 requesting EPA data. For example, the form may comprise EPA evidence element(s) that may indicate what evidence should be collected and/or supplied and may comprise a button to submit the evidence. According to some embodiments, a form may request a combination of user-provided credentials (such as requested by an authentication service/device) and EPA-evidence. Client device 302 may then collect and post the EPA evidence to gateway 360. Gateway 360 may then evaluate the supplied evidence. For example, gateway 360 may deny logon if gateway 360 determines that client device 302's EPA evidence does not provide a suitable environment for logon, and may send to client device 302 a form containing an error message to be displayed on client device 302. Gateway 360 may then end the logon process. In another example, gateway 360 may allow the logon process to continue if gateway 360 determines that the EPA evidence indicates a suitable environment for logon. In another example, gateway 360 may allow logon provided that client device 302 performs certain actions. Gateway 360 may indicate these actions to client device by sending a form to client device 302 indicating an EPA action element that may need to be performed before gateway 360 allows the authentication process to continue (e.g., install anti-virus program, run anti-virus scan, etc.).

At step 608, after receiving the forms login request, gateway 360 may initiate a forms authentication session by sending a request to a pre-configured forms authentication server end point (e.g., enterprise authentication device 504). The request may include information about client device 302's capabilities and any stored data from previous authentication events that device 504 may use to determine how to process the authentication request. The request may also include the IP address of the client device 302 and a client certificate (e.g., for SSL client authentication). Gateway 360 may also generate some additional security information, such as an encryption key (discussed above), cryptographic nonces that may be used to protect the communication channel, and the like.

At step 610, after receiving the request, device 504 may then pass the request to connector 506, which may then pass the request to the third party authentication server 510. As stated above, server 510 may be a third-party authentication server for the application (e.g., managed and/or unmanaged application) running on client device 302. According to some aspects, connector 506 may be configured and/or compatible with the authentication protocols of the third party server 510. For example, connector 506 may be an extension of the authentication device 504 that may allow the third party authentication server 510 to communicate with authentication device 504. Accordingly, connector 506 may comprise knowledge of any authentication protocols used by the third party server 510. According to some aspects, device 504, connector 506, and/or third party server 510 may use security information, such as a pre-shared key, nonces, client ID, or key exchange information, to generate an encryption key. Security information may then be used to encrypt messages.

At step 612, after receiving the request from connector 506, server 510 may examine client device 302's capabilities, stored data that may be presented from previous authentication events, any nonces, client device 302's IP address, and any other information (e.g., security information) to help determine how to process the authentication request. As stated above, server 510 may use nonces and other security information, such as a pre-shared key, client ID, and/or key exchange information, to compute an encryption key, which may be used to encrypt all or part of a response transmitted by server 510 and received by client device 302 or by connector 506. For example, the response may contain an authentication challenge that itself may contain sensitive information, such as knowledge-based questions a user has picked to answer. Additionally, a session cookie may be generated/set to represent the authentication session with server 510. Server 510 may then request that the client device 302 be authenticated on server 510 by requesting that client device 302 provide credential information for one or more authentication protocols, such as risk-based evidence, biometric information, text-based information, speech or sound based information, or any other type of authentication information or evidence (such as shaking or spinning client device 302, looking up some particular grid reference on a physical card, a token or fob code, and the like). Server 510 may then transmit to connector 506 the request for authentication information from client device 302 (e.g., fingerprint).

At step 614, connector 506 (and/or authentication device 504) may generate a credential form that may include the authentication information requested by sever 510. For example, connector 506 may generate a credential form that may request a fingerprint. Additionally, connector 506 (and/or device 504) may request in the form any additional authentication information that may be needed to authenticate client device 302 on authentication device 504. For example, client device 302 may have requested an enterprise service 308 (e.g., App Store 378) and may need to logon to and/or be authenticated by the enterprise authentication device 504 before allowing access to enterprise service 308. Thus, connector 506 (and/or device 504) may include on the form this additional requested authentication information (e.g., text based password). Connector 506 (and/or device 504) may then generate a form (e.g., one or more forms) that may include any of this authentication information (e.g., mutual authentication for server 510 and device 504), and may send the form to gateway 360. This response transmitted to gateway 360 may include security information, such as encryption key material, that may enable the responses to the forms to be encrypted.

According to some aspects, additional layers of encryption may be used to shield information (e.g., credential values or other secret information, such as biometric information) from one or more components/devices in the chain of credential handling. A separate encryption can be negotiated between any disclosed devices and/or components, such that there may be a plurality of encryptions being used in the same authentication process. For example, for a biometric sample, client device 302 may negotiate encryption to gateway 360, authentication device 504, third-party connector 506, and/or third-party authentication server 510. According to some aspects, communications between the gateway 360 and authentication device 504 may use a first encryption key, and communications between the authentication device 504 (e.g., via the third-party connector 506) and the third party authentication server 510 may use a second key. This situation may be used to, for example, protect an enterprise password unsealed by the authentication device 504 and returned to the gateway 360 for a separate authentication protocol (e.g., SSO). According to some aspects, the encryption layer negotiation may be used to insure the recipient of sensitive information (such as the third-party connector 506) may be an approved code device/module that may have been vetted and/or approved by an entity associated with the client device 302 (such as a manufacturer) to ensure the recipient takes appropriate care when handling sensitive information. In some cases, the vetted recipient may be provided secrets which may be used during the encryption key negotiation or otherwise verified, such as a public/private key pair or certificate.

At step 616, gateway 360 may receive this form and may confirm the validity of the form (e.g., using a schema check). According to some aspects, gateway 360 may adjust the host-relative paths (e.g., PostBack and CancelPostBack) that may be included in the form's body. Gateway 360 may also store any cookies generated by device 504 and/or 510. Gateway 360 may set/generate a gateway pre-authentication session cookie for client device 302. Gateway 360 may encrypt the form/message using a key that client device 310 and gateway 360 may have agreed upon in a previous communication. Gateway 360 may then transmit the form (along with any other information such as cookies) to client device 302.

At step 618, the client device 302 may receive the credential form from gateway 360. Client device 302 may then process the form, render the form, and display the form (e.g., to a user of client device 302) as, for example, a user interface that may request the information requested by server 510 and/or device 504 (e.g., fingerprint and/or text based password). It is noted that if other information was requested by server 510 and/or device 504, it may be rendered and/or displayed on client device 302. According to some aspects, a plug-in mechanism 514 that may be stored on client device 302 (or remote to client device 302) may be invoked by client device 302 to generate a display or user interface on client device 302 requesting the authentication credentials, or to generate or obtain authentication credentials in some other way. According to some aspects, gateway 360 may instruct client device 302 to invoke plug-in 514 (e.g., in the plug-in 514 may be in process with the client device 302). For example, if the form requests a user name and a fingerprint sample, then the plug-in 514 may be configured to display the correct/corresponding user interface (e.g., a user interface requesting the fingerprint sample and/or user name) and may display and/or retrieve the correct/corresponding reader, or scanner to collect the fingerprint and/or user name. Additionally, the user interface may have a particular input module. For example, a custom keyboard layout may be rendered to type a password or a custom keyboard input mechanism used to avoid echoing information about the user input.

According to some aspects, the plug-in 514 may communicate with third party entities and/or devices, such as third-party authentication server 510. In these cases, the third-party entities may be cloud services/entities. Thus, in some situations, the plug-in 514 may retrieve any information needed to present the correct form from the third party authentication server 510 or another third party server 512. In some other situations, plug-in 514 might not include a mechanism for communicating with a third-party entity. In such cases, the third party authentication server 510 may provide authentication information (such as an authentication challenge), which may be formatted by the third-party connector 506 into a form (e.g., base64 encoding, XML, JSON, etc.), formatted in such a way to allow the client device 302 to recognize that the form should be made available to the plug-in 504. In such situations, the third-party authentication server 510 may provide an arbitrary input (e.g., fingerprint) to the plug-in 514. In some embodiments, plug-in 514 may be an application (e.g., separate application) running on client device 302 (e.g., if client device 302's operating system does not support plug-in mechanisms), and may be invoked in a similar way as described above. After collecting the authentication credential information, client device 302 may POST the credential information to gateway 360. Using plug-in 514 allows the client device 302 and the plug-in 504 (or plug-ins) to be jointly involved in processing a form. Plug-in 504 may see and modify form information before the form is displayed to the user by the client device 302. Thus, according to some aspects, the plug-in 504 may operate invisibly, such that plug-in 504 might not generate a user-interface, but may modify a form before the form is displayed by the client device 302. The plug-in 504 may also see and process the credential information collected by this form (which could be a mixture of user and plug-in supplied) before the final credential information is posted to the gateway 360. For example, the user input obtained from the (modified or unmodified) form can be used by the plug-in 504 to help obtain or generate the real authentication credential.

FIG. 9 shows an illustrative user interface 900. User interface 900 may include a user name text field 902, a password text field 904, a domain drop down list 906, a Remember my password check box 908, a Log On button 910, a cancel button 912, a secure connection indication 914, and an instruction 916.

According to some aspects, disclosed embodiments may also provide for inline images, such that image data may be included in the form, which could be dynamically generated by, for example, third-party connector 506. In some situations, the form description may focus on a semantic meaning, and disclosed components may base the user interface treatment and/or display on the semantic meaning. According to some aspects, disclosed features may allow for compatibility with different device types that may have different user interface style guides that may be used in accordance with disclosed aspects. Further, disclosed embodiments may include generally accepted user interface patterns that may adjust the interface treatment to match the platform style or conventions. In some cases, interface features, such as a cancel button, may be replaced with a different kind of navigation control based on the platform. In another example, an assistive text for a username field may be produced. In another example, highlighting user input on the form that may not have followed assistive text instructions to include particular information, such as a domain qualifier for the username. Such interface features may comprise a semantic action that can also be invoked by platform specific controls or gestures that might not have a direct visual representation. Such interface features may also be forced and/or invoked by the client device 302 during, for example, a timeout event. Accordingly, a semantic authentication forms approach may allow for the adaptation to local platform conventions and styles that may be implemented with a client writer, such that each client device (and/or plugin) may arrange the display of forms in a customizable manner.

According to some aspects, third-party authentication server 510 and/or authentication device 506 may mark a form as cacheable when, for example, the form does not contain dynamic information. If the client device 302 does not yet support key negotiation, the client device 302 may send a GET request (e.g., with ETAG to avoid wasting bandwidth) while a cached initial form might be displayed to a user, thus allowing gateway 360 to start a fresh authentication conversation with authentication server 510 and/or authentication device 506. According to some aspects, the client device 302 may use a "one way" scheme based on a pre-registered public key, and gateway 360 may negotiate its own encryption session with third-party authentication server 510 and/or authentication device 506 on demand when the POST of the first credential(s) is generated/transmitted. According to some embodiments, the gateway 360 may disable caching, such as when gateway 360 modifies the form received from an authentication service/device in a dynamic way.

At step 620, gateway 360 may receive the credential information from client device 302. According to some aspects, encryption could be operating between client device 302 and gateway 360. Gateway 360 may encrypt some or all of the POST message body with the encryption key for the authentication session with device 504. Gateway 360 may then transmit the form to authentication device 504.

At step 622, the authentication device 504 may pass the credentials to connector 506, which may then pass the credentials requested by the third party authentication server 510. For example, connector 506 may pass information from the scan of the fingerprint to server 510. As noted above, encryption could be operating between various devices/components in the credential processing chain. For example, there may be an "end to end" encryption from client device 302 to connector 506 or third-party authentication server 510. In other aspects, there may be encryption from client device 302 to gateway 360, and a separate encryption from gateway 360 to authentication device 504 (e.g., re-encryption), and the like.

At step 624, the third party authentication server 510 may try to validate/check these credentials with/against credentials stored in a third party server 512. According to some aspects, various credentials (e.g., biometric, text, speech, risk-based, etc.) may be stored by the third party, such as in the third party server 512, ahead of time, and may be cross checked with requested credentials. For example, if information from a fingerprint credential is transmitted to server 510, server 510 may determine whether there is a match of the fingerprint credential in server 512. If there is a match, then the credential may satisfy the credential request made by the third party authentication server 510. If there is no match, then the credential might not satisfy the credential request made by server 510.

According to some aspects, if client device 302 submits credentials that are found to be invalid, server 510 may indicate to connector 506 a reason why the credentials were found to be invalid, and connector 506 may transmit additional credential collection forms that may include annotations or additional information that may guide a user of client device 302 on where a mistake may have been made during a previous entry of credentials. According to some aspects, some components of system 500, such as gateway 360, may strip out descriptive error information or annotations, and may implement more generic error messages and/or may decline the authentication. For example, gateway 360 may layer certain authentication policy controls of its own into the authentication process. Such situations may be advantageous where the third-party authentication server 310, authentication device 504, and connector 506 are used directly by some client devices, while other client devices access these devices via gateway 360. Disclosed embodiments directed to these types of layered controls allow for the form descriptions to describe authentication semantics.

According to some aspects, the gateway 360 (and/or an associated connector filter) may insert additional authentication steps of its own. For example, gateway 360 may insert a legal disclaimer that must be acknowledged by the user to access the system (e.g., before a successful authentication). The gateway 360 may insert these additional authentication steps before or after any of the steps in an established authentication process (e.g., one or more steps of processes 600 or 800, etc.) with or without, for example, needing to understand the semantics of the established authentication process.

According to some aspects, multiple authentication methods, which may be controlled by different components, may be combined. For example, gateway 360 may request and validate a password credential, while the third-party device 510 may request a one-time password based on a hardware token or other scheme (e.g., via forms authentication). Gateway 360 may then use semantic information in the forms generated by connector 506 to rewrite the form to include the additional credential requests that it needs (e.g., the password), and may then separate (or interleave) the different elements of the response from the client device 302.

According to some aspects, during a forms authentication process, the client device 302 may recognize when a change password form is being processed, and may switch (e.g., switch from the forms protocol) to using a different protocol to perform the password change operation in a secure manner, before continuing with a subsequent step in the initial forms authentication process. In some situations, some client devices may support using either an OS API to securely change the password, or may use a Kerberos change password protocol. This feature may allow for a high degree of security for a password change, which may already be a risky operation.

According to some aspects, third party authentication server 510 may require additional authentication information from client device 302, even after validating any initial authentication information sent by client device 302. Requesting additional authentication information may provide for additional security.

For example, during risk-based authentication, server 510 may request risk-based authentication (RBA) evidence from client device 302. According to some aspects, this RBA evidence may be read from client device 302 and transmitted from client device 302 without user interaction. Thus, an enterprise application or program may read the device properties of client device 302 and may build a set of RBA evidence. This RBA evidence may include device ID(s), such as an ID generated specifically for use with RBA, enterprise management IDs, and/or third party IDs that may be assigned to a client device. According to some aspects, one or more of these IDs may or might not be based on a hardware ID, such as a MAC address, UDID, etc. The RBA evidence may include a geo-location, jailbreak status, screen size, and/or cellular and/or data provider/carrier (e.g., country code, network code, carrier name, etc.). The RBA evidence may also include user settings, such as user selected device name, current time, time zone, time and date formats (e.g., 12 or 24 hour cloth, date ordering), display language (current or previous), enabled keyboards, etc. The RBA evidence may also include user data statistics, such as media (e.g., song, video, picture, contact) information. A risk-based assessment may include known access patterns (e.g., if the client device 302 is using an unknown or unfamiliar access pattern, then there may be a possible risk). A risk-based assessment may also use knowledge of attacks (e.g., real-time knowledge of malicious attacks), such that if there is knowledge of a current attack or impending attack, then a higher risk may be associated with the authentication request. According to some aspects, some RBA evidence may be obtained directly by gateway 360 and/or authentication device 504. This information may include a client device IP address, user agent string(s), SSL client certificate(s), and the like. According to some aspects, based on at least any of this RBA evidence or information, if server 510 determines that the context for access/authentication might be risky (e.g., high or moderate risk), then third party authentication server 510 may request additional authentication information or may deny login.

FIG. 10 shows an illustrative user interface 1000 that may be displayed on client device 302 and may request additional authentication information. User interface 1000 may include a primary instruction 1002, a secondary instruction 1004, a field configured to receive input (e.g., text field) 1006, a next button 1008, and an indication of a secure connection 1010. User interface 1000 may be used to request additional authentication information that may be requested by server 510.

If additional authentication information is not requested, then process 600 may continue to step 640 after the validation of the initial authentication credentials. If additional authentication information is requested, then at step 626, server 510 may indicate to connector 506 the authentication information requested from client device 302 (e.g., similar to step 612). At step 628, connector 506 (and/or authentication device 504) may generate credential forms, and send these form to gateway 360 (e.g., similar to step 614). At step 630, gateway may send these forms to client device 302 (e.g., similar to step 616). At step 632, the client device 302 may collect these credentials and transmit them to gateway 360 (e.g., similar to step 618). At step 634, the gateway may collect these credentials and transmit them to authentication device 504 (e.g., similar to step 620). At step 636, the authentication device 504 may pass these credentials to connector 506, which may pass the credentials to the third party authentication server 510 (e.g., similar to step 622). At step 638, the third party authentication server 510 may then try to validate the credentials (e.g., similar to step 624). This process may be repeated for as many times as necessary.

At step 640, after a successful validation of the authentication credentials, server 510 may generate an OK response (e.g., HTTP 200) that indicates a successful validation. The server 510 may then transmit to authentication device 504 (e.g., via third party connector 506), any information associated with client device 302, such as user ID(s), group information, session password, and the like. For example, authentication device 504 may transmit risk assessment information from RBA, or various kinds of claims that may be asserted by identity or attribute providers that may follow, for example, a SAML model. This information may be used in various ways or processes. For example, gateway 360 and/or authentication device 504 may pass the information to an application (e.g., an enterprise associated application) running on client device 302 as smart access conditions, which may be used as inputs to various policy evaluation engines. These policy controls may then be used to block access to certain resources and/or disable certain functionality when using these resources, such as denying a copy and paste function or printing function from enterprise session hosted via the enterprise associated application. In some cases, some or all of this information may be encrypted using the same key as in previous steps. At step 642, this information along with the OK response may then be transmitted to gateway 360.

At step 644, gateway 360 may receive the OK response along with the additional information associated with client device 302 (e.g., user ID(s), group information, session password, and the like). Gateway 360 may process and validate this information (e.g., password information) and may provide an approximate choice to client device 302. Gateway 360 and client device 302 may use this password information for additional authentication purposes, such as SSO authentication.

For example, client device 302 may request to authenticate to authentication device 504 (e.g., to access an enterprise resource). In such situations, client device 302 may initiate a conversation with authentication device 504, thereby exchanging tokens for a token issuer and tokens for the requested enterprise resource. For example, authentication device 504 may indicate a number of choices for logging into authentication device 504 (e.g., Single-Sign-On (SSO), Password, Kerberos, Smartcard, forms logon, and the like). After selecting an authentication choice, client device 302 may request from authentication device 504 a token for a token issuer of a requested enterprise resource. After being provided this this token by, for example, authentication device 504, client device 302 may request from the token issuer a token to access the requested resource.

According to some aspects, the communication between client device 302 and authentication device 504 may be via gateway 360. In such situations, during this process, gateway 360 may use any information (e.g., password information) that was transmitted to it at step 642 in the authentication process (e.g., for SSO login). In other situations, client device 302 may pass authentication credentials to authentication device 504, which may check/validate these credentials with/against credentials stored in an active directory 422. For example, when the login mechanism involves an AD password and/or username (e.g., because the user typed it or it is recovered from a password vault), the gateway 360 may cache this password as part of the authenticated session data. After enterprise resources are accessed via the gateway 360, the gateway 360 may know the access protocol (e.g., web proxy mode). The authentication required by the enterprise resource may allow gateway 360 to react to the authentication request and respond using the cached information (e.g., user name and/or password), which may be done without the client device 302 have knowledge of this. Thus, in some cases, the step of the client device 302 requesting to authenticate using forms login might not need to occur, but may occur when the form may contain some fresh information. This caching aspect may provide for improvements in speed, as authentication challenges might not be sent all the way back to the client device 302.

Gateway 360 may then transmit a query to the client device 302 for the desired type of session for client device 302. The session type (e.g., VPN, CVPN, WICA, etc.) may be determined by session policies and may be applied (e.g., automatically) before sending an authentication response to the client device 302. According to some aspects, gateway 360 may generate additional forms to determine a desire session, and may send these forms to the client device 302. These forms may include session type choices from which a user may select a session type. In some cases, the session type may already be established, and there may be no need for client device 302 to choose a session type.

At step 646, gateway 360 may receive and display these forms. After selecting a type of session, client device 302 may transmit the desired session type to gateway 360.

At step 648, gateway 360 may then determine whether there are sufficient licenses for the type of session and/or whether a session transfer may be needed. In some situations, gateway 360 may determine that the enterprise does not have a sufficient number of licenses. In such situations, gateway 360 may generate an error dialog form and/or an HTTP 480 response that may be sent to and/or displayed on client device 302. Authentication may be rejected upon acceptance of this form by client device 302. If gateway 360 determines that a session transfer is needed, then gateway 360 may transmit a form to client device 302 requesting consent (e.g., of a user) to transfer the session. If there are multiple sessions that may be used in the transfer, the form may include choices for these sessions. Thus, after determining, setting the session, gateway 360 may activate the chosen session type, and may then transmit the OK authentication response (e.g., along with the session information and/or other information) to client device 302.

In some cases, gateway 360 may transmit an authentication session cookie to client device 302, which may establish an authenticated gateway session for client device 302. According to some aspects, gateway 360 may discard of any pre-authentication session information (e.g., pre-authentication cookies, encryption keys, etc.), and may provide additional information (such as the authentication session cookie or encryption keys) to client device 302.

According to some embodiments, gateway 360 may perform a post-EPA scan of client device 302, which may be similar to the pre-EPA scan discussed herein. This post EPA scan may be performed before determining or setting a session type or transfer, and may also be performed before sending to client device 302 an authentication success response.

At step 650, after receiving the validated authentication response, client device 310 may begin the selected session (e.g., WICA, CVPN, etc.).

FIG. 7 is an illustrative system 700 that may implement one or more features described herein. System 500 may include client device 302 (e.g., from FIG. 3), which may be a computing device, and may be similar to terminal 240 or enrolled mobile device 402. Client device 302 may communicate with enterprise services 308 (e.g., from FIG. 3). Enterprise services 308 may include services such as an application controller 374, application store 378, enterprise resources 304, and the like. Client device 302 may communicate with a gateway 360, which may be the same as gateway 360 in FIGS. 3 and 5 and/or similar to gateway 406. Client device 302 may communicate (e.g., via gateway 360) with an authentication device 504. Gateway 360 may be configured with one or more authentication policies or protocols of a third-party authentication server.

According to some aspects, authentication device 504 may be the same as or similar to authentication service 358. In some cases, authentication device 504 may be an authentication service of (or otherwise associated with) an enterprise resource, such as App Store 378 or App controller 374. Additionally, authentication device 504 may include various options and protocols for authentication/login methods/types, such as forms-based login, password login, Kerberos login, Smartcard login, and Access Gate Single Sign-On (AG SSO), and the like. It noted that any other login/authentication method may implemented according to aspects disclosed herein. According to some aspects, gateway 360 may, for example, authenticate client devices by presenting the received authentication credentials to an active directory (such as AD 422), which may rule on the accuracy and/or validity of the authentication credentials. Such authentication may be for authentication client device 302 on an enterprise system, such as system 300 and/or system 400.

System 700 may include a third-party authentication server 710. Server 710 may be an authentication server configured to receive and validate authentication credentials transmitted by client device 302 (e.g., by an application running on client device 302). Third-party authentication server 710 may include a third-party adapter 706 that may be used by server 710 to communicate with gateway 360 and/or client device 302. According to some aspects, adapter 706 may be configured to extend to multiple client for different platforms and may communicate with gateway 360 (e.g., via HTTP or HTTPS). Adapter 706 may be configured with one or more authentication protocols of server 710. Such authentication protocols may include using risk-based evidence, biometric information, text-based information, speech or sound based information, short message service, knowledge-based authentication, or any other type of authentication information or evidence. Adapter 706 may be part of authentication service 710 or may be a separate component (e.g., separate computing device). Adapter 706 may be based on an authentication extension configured with a software development kit (SDK).

Server 710 may provide information, such as required authentication information requested from client device 302, to adapter 706. Adapter 706 may use this information received from server 710 to generate items (e.g., forms, challenges, questions, etc.) which may be passed to client device 302 via gateway 360. According to some aspects, after client device 302 receives this requested authentication information, a script or program, such as a plug-in 714 or application, located on client device 302 (or remote to client device 302) may be invoked, and may invoke the third party authentication protocol. Plugin 714 may, in some form, request the requested authentication information from, for example, a user of client device 302. For example, a user interface may be presented on client device 302 that may request a user input the requested authentication information. According to some aspects, such a user interface may be presented on client device 302 in an auditory or visual manner. For example, if a finger print sample is requested as the authentication information, plug-in 714 may display a user interface that requests a finger print sample and may select a corresponding fingerprint reader or scanner to collect the fingerprint. Plug-in 714 may retrieve (e.g., via a third-party gateway device 716) the user interface information from server 710 and/or server 712.

FIG. 8 is an illustrative process 800 illustrating a flow schematic of client authentication via third party authentication support in accordance with one or more features described herein. Process 800 may be performed by a system, such as system 600. For example, in one or more embodiments, the process 800 illustrated in FIG. 8 and/or one or more steps thereof may be performed by a computing device (e.g., any device of FIGS. 1-4 and 7). In other embodiments, the process illustrated in FIG. 8 and/or one or more steps thereof may be embodied in computer-executable instructions that are stored in a computer-readable medium, such as a non-transitory computer-readable memory. Alternatively or additionally, any of the steps in process 800 may be performed on any client device, gateway device, enterprise server machine, or third-party server or computing device. As shown in FIG. 8, system 800 may include a client device 302, a gateway device 360, authentication device 504, adapter 706, and third party authentication server 710.

Process 800 may begin with step 802 in which client device 302 may send a request that may request whether gateway 360 supports a particular type of logon protocol. This step may be similar to step 602 described above with respect to FIG. 6.

At step 804, gateway 360 may receive this request from client device 302. If gateway 360 does not support a requested authentication protocol (e.g., form, Single-Sign-On (SSO), etc.) then gateway 360 may transmit to client device 302 a recognizable HTTP response, such as a 403 Forbidden or 302 Found (e.g., redirection to another URL, such as /vpn/index.html), which may provide a fallback option for client device 302. If gateway 360 does support a requested authentication protocol, then gateway 360 may transmit to client device 302 a response indicating that gateway 360 supports the requested protocol, such as a 200 OK response that may include the content type supported (e.g., forms, SSO, etc.). This step may be similar to step 604 described above with respect to FIG. 6.

At step 806, after receiving a response from gateway 360 indicating support of the requested protocol, client device 302 may initiate a login request using the logon protocol. In this example, the logon protocol is a forms-based protocol. However, any other logon/authentication protocol may be used. This step may be similar to step 606 described above with respect to FIG. 6.

According to some embodiments, gateway 360 may perform a pre-authentication scan (e.g., Endpoint Analysis (EPA) scan) of client device 302, such as before step 806. This scan is discussed in more detail above with respect to FIG. 6.

At step 808, after receiving the forms login request, gateway 360 may initiate a forms authentication session by sending a request to a pre-configured forms third-party adapter 706 that may be associated with a third-party authentication server end point (e.g., third-party authentication server 710). The request may include information about client device 302's capabilities and any stored data from previous authentication events that may be used to determine how to process the authentication request. The request may also include the IP address of the client device 302 and a client certificate (e.g., for SSL client authentication). Gateway 360 may also generate some additional security information, such as cryptographic nonces that may be used to protect the communication channel.

At step 810, after receiving the request, adapter 706 may pass the request to server 710. As stated above, server 710 may be a third-party authentication server for the application (e.g., managed and/or unmanaged application) running on client device 302. According to some aspects, adapter 706 may be configured and/or compatible with the authentication protocols of the gateway 360 and/or third party server 710. For example, adapter 706 may be an extension of the server 710 that may allow the third party authentication server 710 to communicate with gateway 360. Accordingly, adapter 706 may comprise knowledge of any authentication protocols used by the third party server 710 and/or gateway 360. According to some aspects, gateway 360, adapter 706, and third party server 710 may use security information, such as a pre-shared key, nonces, client ID, to generate an encryption key. Security information may then be used to encrypt messages. Additionally, a session cookie may be generated/set by server 710 to represent the authentication session with server 710. Server 710 may examine any received information, such as client device 302's capabilities, stored data that may be presented from previous authentication events, any nonces, client device 302's IP address, and any other information (e.g., security information) to help determine how to process the authentication request. Server 710 may then request that the client device 302 be authenticated on server 710 by requesting that client device 302 provide credential information for one or more authentication protocols, such as risk-based evidence, biometric information, text-based information, speech or sound based information, or any other type of authentication information or evidence (such as shaking or spinning client device 302, looking up some particular grid reference on a physical card, a token or fob code, and the like). Server 710 may then transmit to adapter 706 the request for authentication information from client device 302 (e.g., fingerprint). Adapter 706 (and/or authentication device 504) may generate a credential form that may include the authentication information requested by sever 710

At step 812, gateway 360 may receive this form and may confirm the validity of the form (e.g., using a schema check). According to some aspects, gateway 360 may adjust the host-relative paths (e.g., PostBack and CancelPostBack) that may be included in the form's body. Gateway 360 may also store any cookies generated by device 504 and/or server 710. Gateway 360 may set/generate a gateway pre-authentication session cookie for client device 302. Gateway 360 may encrypt the form/message using a key that client device 310 and gateway 360 may have agreed upon in a previous communication. Gateway 360 may then transmit the form (along with any other information such as cookies) to client device 302.

At step 814, the client device 302 may receive the credential form from gateway 360. Client device 302 may then process the form, render the form, and display the form (e.g., to a user of client device 302) as, for example, a user interface. According to some aspects, a plug-in mechanism 714 that may be stored on client device 302 (or remote to client device 302) may be invoked by client device 302 to generate a display or user interface on client device 302 requesting the authentication credentials. The plug-in 714 may retrieve any information needed to present the correct form from the third party authentication server 710 or another third party server 712. In some embodiments, plug-in 714 may be an application running on client device 302 (e.g., if client device 302's operating system does not support plug-in mechanisms). After collecting the authentication credential information, client device 302 may POST the data to gateway 360.

At step 816, gateway 360 may receive the credential information from client device 302. Gateway 360 may encrypt some or all of the POST message body with the encryption key for the authentication session with device 504. Gateway 360 may then transmit the form to adapter 706.

At step 818, adapter 706 may pass the credentials to authentication server 710. For example, adapter 706 may pass information from the scan of the fingerprint to server 710. The third party authentication server 710 may then try to validate/check these credentials with/against credentials stored in a third party server 712. If there is a match, then the credential may satisfy the credential request made by the third party authentication server 710. If there is no match, then the credential might not satisfy the credential request made by server 710. According to some aspects, if client device 302 submits credentials that are found to be invalid, server 710 may indicate to adapter 706 a reason why the credentials were found to be invalid, and adapter 706 may transmit additional credential collection forms to client device 302 that may include annotations or additional information that may guide a user of client device 302 on where a mistake may have been made during a previous entry of credentials.

According to some aspects, third party authentication server 710 may require additional authentication information from client device 302, even after validating any initial authentication information sent by client device 302. Requesting additional authentication information may provide for additional security. FIG. 10 shows an illustrative user interface 1000 that may be displayed on client device 302 and may request additional authentication information, which is described above. In one example, during risk-based authentication, server 710 may request risk-based authentication (RBA) evidence from client device 302.

If additional authentication information is not requested, then process 800 may continue to step 830 after the validation of the initial authentication credentials. If additional authentication information is requested, then at step 820, server 710 may indicate to adapter 706 the authentication information requested from client device 302 (e.g., similar to step 810). Adapter 706 may then generate credential forms, and send these forms to gateway 360.

At step 822, gateway may send these forms to client device 302 (e.g., similar to step 812). At step 824, the client device 302 may collect these credentials and transmit them to gateway 360 (e.g., similar to step 814). At step 826, the gateway 360 may collect these credentials and transmit them adapter 706 (e.g., similar to step 816). At step 828, the adapter 706 may pass the credentials to the third party authentication server 710 (e.g., similar to step 818). The third party authentication server 710 may then try to validate the credentials.

At step 830, after a successful validation of the authentication credentials, server 710 may generate an OK response (e.g., HTTP 200) that indicates a successful validation, and may transmit this (e.g., via third party adapter 706) to gateway 360, along with any information associated with client device 302, such as user ID(s), group information, session password, and the like that may have been retrieved from third party server 712. In some cases, some or all of this information may be encrypted using the same key as in previous steps.

At step 832, gateway 360 may receive the OK response along with the additional information associated with client device 302 (e.g., user ID(s), group information, session password, and the like). Gateway 360 may process and validate this information (e.g., password information) and may provide an approximate choice to client device 302.

Gateway 360 and client device 302 may use this password information for additional authentication purposes, such as Single Sign On, which is described above with respect to FIG. 6. During these additional authentication processes, gateway 360 may use any information (e.g., password information) that was transmitted to it at step 832 in the authentication process (e.g., for SSO login). Gateway 360 may check/validate the password information with/against information stored in an active directory 422.

Gateway 360 may then transmit a query to the client device 302 for the desired type of session for client device 302. The session type (e.g., VPN, CVPN, WICA, etc.) may be determined by session policies and may be applied before sending an authentication response to the client device 302. Gateway 360 may generate additional forms to determine a desire session, and may send these forms to the client device 302. These forms may include session type choices from which a user may select a session type. In some cases, after a successful authentication, the session type may already be established, and there may be no need for client device 302 to choose a session type.

At step 834, gateway 360 may receive and display these forms. After a selection of a type of session is made, client device 302 may transmit the desired session type to gateway 360.

At step 836 gateway 360 may then determine whether there are sufficient licenses for the type of session and/or whether a session transfer may be needed, which is described above in step 648 with respect to FIG. 6. If gateway 360 determines that a session transfer is needed, then gateway 360 may transmit a form to client device 302 requesting consent (e.g., of a user) to transfer the session. If there are multiple sessions that may be used in the transfer, the form may include choices for these sessions. Thus, after determining, setting the session, gateway 360 may activate the chosen session type, and may then transmit the OK authentication response (e.g., along with the session information and/or other information) to client device 302.

In some cases, gateway 360 may transmit an authentication session cookie to client device 302, discard of any pre-authentication session information, and provide additional information (such as the authentication session cookie or encryption keys) to client device 302.

According to some embodiments, gateway 360 may perform a post-EPA scan of client device 302, which may be similar to the pre-EPA scan discussed herein. This post EPA scan may be performed before determining or setting a session type or transfer, and may also be performed before sending to client device 302 an authentication success response.

At step 838, after receiving the validated authentication response, client device 310 may begin the selected session (e.g., WICA, CVPN, etc.).

FIG. 11 is an illustrative system 1100 that may implement one or more features described herein. System 1100 may include client device 302, gateway 360, enterprise services 308, authentication service 1104 (which may be the same as, similar to, and/or a combination as authentication device 504 and/or 704), third party connector 506, third-party adapter 706, third-party authentication server 1110 (which may be the same as, similar to, and/or a combination of third party authentication server 510 and/or 710), third party server 1112 (which may be the same as, similar to, and/or a combination of third party server 512 and/or 712), active directory 422, plug-in 1114 (which may be the same as, similar to, and/or a combination of plugin 514 and/or 714), and third party gateway 1116 (which may be the same as, similar to, and/or a combination of third party gateway 516 and/or 518). System 1100 may illustrate a collaborative environment of systems 500 and 700, and may perform any of the steps described herein with respect to FIGS. 5-8. For example, gateway 360 may determine which component (e.g., authentication device 1104 or adapter 706) to communicate with depending on policies stored on gateway 360, authentication configuration of gateway 360, which type of login protocol was chosen by client device 302, and the like. Additionally, as stated above, the gateway 360 may combine and/or selectively choose authentication methods from multiple sources to create an aggregate or amalgamated authentication process. Thus, gateway 360 may combine two or more independently created authentication methods (extensions), and implement these authentication methods in a predefined order or sequence. According to some aspects, gateway 360 may dynamically determine the order based on attributes of the authentication request, such as client type (user-agent), IP address, and the like. Based on policies, the gateway 360 may, for example, require that some or all of the authentication methods pass (e.g., validate) to complete login, or gateway 360 might stop the authentication process after the first authentication method reported a successful validation (e.g., use AND and OR combining methods). The different stages may be overlapped from the perspective of the client device 302, such that the credential information requested by two or more authentication servers (e.g., third-party authentication servers) might be merged into a single form. According to some aspects, these authentication servers may be part of gateway 360, such as in cases where there may be a local account system. According to some aspects, if multiple authentication servers request credentials (e.g., a username), which might be expected or required to be the same, the merged form may request information (e.g., the username) one time. In some embodiments, to guide the merging process, authentication servers (e.g., third-party authentication servers) may tag the credential information request fields in forms in a manner beyond the semantic content that may be provided. For example numerical values (e.g., 100, 200, 300, etc.) may be given to each field, following certain conventions, so that the fields may be put into numerically increasing order when combined. The authentication sources being combined may individually use, for example, process 600 and/or 800 to communicate with the gateway 360. According to some aspects, the gateway 360 may use various policies if multiple successful authentication methods provide information (e.g., user/group/credential information) with inconsistencies. According to some aspects, a plurality of forms may be transmitted and/or received by one or more disclosed components (e.g., gateway 360, client device 302, etc.) sequentially or simultaneously.

According to some aspects, each authentication device/server might desire to share an encryption key with the client device 302 rather than just with the gateway 360. In such cases, encryption key negotiation steps may be repeated during the authentication process after the gateway 360 switches to communicating the next authentication device/server. According to some aspects, the gateway 360 may handle one or more of these authentication steps, based on, for example, a locally defined account and/or password, or by using other authentication protocols to communicate with authentication servers/devices, AD 422, or other types of account directories. For example, referring to FIG. 7, the gateway 360 may use various protocols to validate a username and/or a password with AD 422 or with the third party authentication server 710. The gateway 360 may present the request for this credential information to the client device using a form generated by gateway 360, or gateway 360 may merge the fields requesting this information with a form provided by an authentication server/device.

According to some aspects, the merging process may include interleaving of individual authentication steps from authentication processes associated with different authentication servers/devices. One example may be when an authentication server is performing risk analysis. In such cases, before the authentication server performs the analysis, the gateway 360 may need to validate one or more user credentials (e.g., username, password, etc.) to establish the purported user identity with some level of confidence. However, if the user password is expired and must be changed to complete login, the authentication server/device may first complete the risk analysis, so that the password change may be denied if the situation is determined to be too risky. The risk analysis may then be followed with additional authentication steps (which may be independent of the password) to allow login, and thus allow the password to then be changed.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
   transmitting, by a computing device to an authentication device via a network, a request to authenticate a client device application via a forms login protocol;
   retrieving, by the computing device from the authentication device via the network, an authentication challenge and a first credential form requesting a first authentication credential, wherein the first credential form is generated, by an extension device connected to the authentication device, based on information received from an authentication service associated with the client device application, the extension device being configured with one or more authentication protocols of the authentication service associated with the client device application;
   transmitting, by the computing device to the client device application via the network, the first credential form and the authentication challenge;
   receiving, by the computing device from the client device application via the network, the first authentication credential and a response to the authentication challenge;
   transmitting, by the computing device to the authentication service via the extension device, the first authentication credential and the response to the authentication challenge; and
   transmitting, by the computing device via the network and in response to a successful validation of the first authentication credential and a successful response to the authentication challenge, an approval of the request made by the client device application to authenticate via the forms login protocol.

2. The method of claim 1, wherein transmitting, by the computing device to the client device application, the first credential form further comprises transmitting, by the computing device to the client device application, an instruction to invoke a plug-in mechanism that obtains the first authentication credential, wherein the plug-in mechanism communicates with the authentication service associated with the client device application.

3. The method of claim 2, wherein the plug-in mechanism displays, on a user device, a user interface requesting the first authentication credential using information retrieved from the authentication service associated with the client device application.

4. The method of claim 1, further comprising:
retrieving, by the computing device from the authentication device, a second credential form requesting a second authentication credential;
transmitting, by the computing device to the client device application, the second credential form;
receiving, by the computing device from the client device application, the second authentication credential; and
transmitting, by the computing device to the authentication device, the second authentication credential.

5. The method of claim 4, further comprising:
retrieving, by the computing device, the first credential form associated with a first authentication service; and
retrieving, by the computing device, the second credential form associated with a second authentication service.

6. The method of claim 5, wherein transmitting the first and the second credential forms comprises:
combining the first and the second credential forms into a third credential form; and
transmitting, by the computing device to the client device application, the third credential form.

7. The method of claim 5, wherein the first credential form is associated with a first authentication process and the second credential form is associated with a second authentication process, the method further comprising implementing one or more phases of the second authentication process after beginning the first authentication process and before completing the first authentication process.

8. The method of claim 1, where the computing device comprises a gateway device, the method further comprising passing, by the gateway device to the client device application, at least one of a first session identifier associated with a gateway device authentication session and a second session identifier associated with an authentication device authentication session.

9. The method of claim 1, further comprising:
transmitting, by the computing device to the client device application and after approving the request to authenticate via the forms login protocol, session information; and
receiving, by the computing device from the client device application, a confirmation of a session.

10. The method of claim 1, further comprising:
receiving, by the computing device from the client device application, a request for an indication that the computing device supports a forms login protocol; and
transmitting, by the computing device to the client device application, a message indicating the computing device supports a forms login protocol.

11. The method of claim 1, wherein the authentication device comprises the extension device.

12. The method of claim 1, wherein the authentication device comprises the authentication service associated with the client device application and the extension device.

13. The method of claim 1, wherein communications transmitted between the computing device and the authentication service associated with the client device application comprise data encrypted according to a first encryption, and communications transmitted between the authentication device and the computing device comprise data encrypted according to a second encryption different from the first encryption.

14. A system, comprising:
at least one processor; and
at least one memory storing instructions that, when executed by the at least one processor, cause the system to perform:
transmitting, by a computing device to an authentication device via a network, a request to authenticate a client device application via a forms login protocol;
retrieving, by the computing device from the authentication device via the network, an authentication challenge and a first credential form requesting a first authentication credential, wherein the first credential form is generated, by an extension device connected to the authentication device, based on information received from an authentication service associated with the client device application, the extension device being configured with one or more authentication protocols of the authentication service associated with the client device application;
transmitting, by the computing device to the client device application via the network, the first credential form and the authentication challenge;
receiving, by the computing device from the client device application, the first authentication credential and a response to the authentication challenge;
transmitting, by the computing device to the authentication service via the extension device, the first authentication credential and the response to the authentication challenge; and
transmitting, by the computing device via the network and in response to a successful validation of the first authentication credential and a successful response to the authentication challenge, an approval of the request made by the client device application to authenticate via the forms login protocol.

15. The system of claim 14, wherein transmitting, by the computing device to the client device application, the first credential form further comprises transmitting, by the computing device to the client device application, an instruction to invoke a plug-in mechanism that obtains the first authentication credential, wherein the plug-in mechanism communicates with the authentication service associated with the client device application.

16. The system of claim 14, the instructions further cause the system to perform:
retrieving, by the computing device from the authentication device, a second credential form requesting a second authentication credential;
transmitting, by the computing device to the client device application, the second credential form;
receiving, by the computing device from the client device application, the second authentication credential; and
transmitting, by the computing device to the authentication device, the second authentication credential.

17. The system of claim 14, wherein the authentication device comprises the authentication service associated with the client device application and the extension device.

18. One or more non-transitory computer-readable storage media having instructions stored thereon, that when executed by one or more processors, cause the one or more processors to perform:

transmitting, by a computing device to an authentication device via a network, a request to authenticate a client device application on a user device via a forms login protocol;

retrieving, by the computing device from the authentication device via the network, an authentication challenge and a first credential form requesting a first authentication credential, wherein the first credential form is generated, by an extension device connected to the authentication device, based on information received from an authentication service associated with the client device application, the extension device being configured with one or more authentication protocols of the authentication service associated with the client device application;

transmitting, by the computing device to the client device application via the network, the first credential form and the authentication challenge and;

receiving, by the computing device from the client device application via the network, the first authentication credential and a response to the authentication challenge;

transmitting, by the computing device to the authentication service via the extension device, the first authentication credential and the response to the authentication challenge; and transmitting, by the computing device and in response to a successful validation of the first authentication credential and a successful response to the authentication challenge, an approval of the request made by the client device application to authenticate via the forms login protocol.

19. The one or more non-transitory computer-readable storage media of claim 18, wherein transmitting, by the computing device to the client device application, the first credential form further comprises transmitting, by the computing device to the client device application, an instruction to invoke a plug-in mechanism that obtains the first authentication credential, wherein the plug-in mechanism communicates with the authentication service associated with the client device application.

20. The one or more non-transitory computer-readable storage media of claim 18, the instructions further cause the one or more processors to perform:
retrieving, by the computing device from the authentication device, a second credential form requesting a second authentication credential;
transmitting, by the computing device to the client device application, the second credential form;
receiving, by the computing device from the client device application, the second authentication credential; and
transmitting, by the computing device to the authentication device, the second authentication credential.

21. The method of claim 1, further comprising:
performing, by the computing device, prior to the computing device transmitting to the authentication device the request to authenticate the client device application via the forms login protocol, a pre-authentication scan of a client device running the client device application,
wherein, based on results of the pre-authentication scan of the client device, authentication of the client device application is either aborted or allowed to continue.

22. The system of claim 14, the instructions further cause the system to perform:
performing, by the computing device, prior to the computing device transmitting to the authentication device the request to authenticate the client device application via the forms login protocol, a pre-authentication scan of a client device running the client device application,
wherein, based on results of the pre-authentication scan of the client device, authentication of the client device application is either aborted or allowed to continue.

23. The one or more non-transitory computer-readable storage media of claim 18, the instructions further cause the one or more processors to perform:
performing, by the computing device, prior to the computing device transmitting to the authentication device the request to authenticate the client device application via the forms login protocol, a pre-authentication scan of a client device running the client device application,
wherein, based on results of the pre-authentication scan of the client device, authentication of the client device application is either aborted or allowed to continue.

* * * * *